US012792512B2

(12) United States Patent
Kim et al.

(10) Patent No.: US 12,792,512 B2
(45) Date of Patent: Nov. 10, 2026

(54) MEMORY DEVICE SUPPORTING METADATA MODE AND OPERATION METHOD OF MEMORY SYSTEM

(71) Applicant: SAMSUNG ELECTRONICS CO., LTD., Suwon-si (KR)

(72) Inventors: Chinam Kim, Suwon-si (KR); Do-Han Kim, Suwon-si (KR); Dongha Kim, Suwon-si (KR); Changmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/962,577

(22) Filed: Nov. 27, 2024

(65) Prior Publication Data

US 2025/0231875 A1 Jul. 17, 2025

(30) Foreign Application Priority Data

Jan. 12, 2024 (KR) ........................ 10-2023-0170332
Jan. 12, 2024 (KR) ........................ 10-2024-0005379

(51) Int. Cl.
*G06F 12/0802* (2016.01)

(52) U.S. Cl.
CPC ................................ *G06F 12/0802* (2013.01)

(58) Field of Classification Search
CPC ..... G06F 2212/7203; G06F 2212/7207; G06F 2212/1016
See application file for complete search history.

(56) References Cited

U.S. PATENT DOCUMENTS 9,753,858 B2 9/2017 Loh et al.
10,769,013 B1 9/2020 MacLaren et al.
11,036,887 B2 6/2021 Troia et al.
11,126,379 B2 9/2021 Kim
11,144,460 B2 10/2021 Lee
2011/0251819 A1* 10/2011 Ong .................. G01R 31/2889 702/120
2012/0297256 A1 11/2012 Plondke et al.
2015/0074355 A1 3/2015 Sampathkumar et al.
2019/0188156 A1* 6/2019 Sampathkumar ..... G06F 12/128
(Continued)

FOREIGN PATENT DOCUMENTS

KR 10-1559023 B1 10/2015
KR 10-2021-0011216 A 2/2021
(Continued)

OTHER PUBLICATIONS

European Extended Search Report issued Mar. 10, 2025 by the European Patent Office for EP Patent Application No. 24215690.9.
(Continued)

*Primary Examiner* — Nicholas A. Paperno
(74) *Attorney, Agent, or Firm* — Sughrue Mion, PLLC

(57) ABSTRACT

A memory device includes a memory bank including a plurality of memory cells and a bank register corresponding to the memory bank. The memory bank includes a main data region that stores user data and a metadata region that stores metadata corresponding to the user data. The bank register includes a metadata register that caches the metadata to be stored in the metadata region and a dirty bitmap including location information where the metadata is to be stored in the metadata region.

18 Claims, 36 Drawing Sheets

(56) References Cited

U.S. PATENT DOCUMENTS

| | | | | |
|---|---|---|---|---|
| 2022/0405253 | A1 | 12/2022 | Agrawal et al. | |
| 2023/0040696 | A1* | 2/2023 | Tomlin | G06F 3/0659 |
| 2023/0205693 | A1* | 6/2023 | Kotra | G06F 12/0811<br>711/122 |
| 2023/0223096 | A1 | 7/2023 | Bains et al. | |

FOREIGN PATENT DOCUMENTS

| | | | |
|---|---|---|---|
| KR | 10-2022-0005832 | A | 1/2022 |
| KR | 10-2022-0170359 | A | 12/2022 |

OTHER PUBLICATIONS

JEDEC, LPDDR6 System Meta Function, Sponsor: Qualcomm, Co-Sponsor: Samsung, Item No. 1878.34, Mar. 2023, 14 pages.

* cited by examiner

FIG. 6

| ROW (WL) | COL (CSL) | Data | | | |
|---|---|---|---|---|---|
| 1 | 1 | User Data (32B) | | | Main Data Region (MDR) |
| | ⋮ | ⋮ | | | |
| | 60 | User Data (32B) | | | |
| | 61 | 2B Metadata of COL1 | ··· | 2B Metadata of COL16 | Metadata Region (MR) |
| | 62 | 2B Metadata of COL17 | ··· | 2B Metadata of COL32 | |
| | 63 | 2B Metadata of COL33 | ··· | 2B Metadata of COL48 | |
| | 64 | 2B Metadata of COL49 | ··· | 2B Metadata of COL60 | |
| 2 | 1 | User Data (32B) | | | Main Data Region (MDR) |
| | ⋮ | ⋮ | | | |
| | 60 | User Data (32B) | | | |
| | 61 | 2B Metadata of COL1 | ··· | 2B Metadata of COL16 | Metadata Region (MR) |
| | 62 | 2B Metadata of COL17 | ··· | 2B Metadata of COL32 | |
| | 63 | 2B Metadata of COL33 | ··· | 2B Metadata of COL48 | |
| | 64 | 2B Metadata of COL49 | ··· | 2B Metadata of COL60 | |
| ⋮ | ⋮ | ⋮ | | | |

MEMORY DEVICE SUPPORTING METADATA MODE AND OPERATION METHOD OF MEMORY SYSTEM

CROSS-REFERENCE TO RELATED APPLICATION(S)

This application claims priority to and the benefit of Korean Patent Application No. 10-2023-0170332, filed on Nov. 30, 2023, and Korean Patent Application No. 10-2024-0005379, filed on Jan. 12, 2024, in the Korean Intellectual Property Office, the disclosures of which are incorporated herein by reference in their entireties.

BACKGROUND

Embodiments of the present disclosure relate to a memory device and an operation method thereof.

Memory devices are used to store data and classified into volatile memory devices and nonvolatile memory devices. A volatile memory device loses its stored data when the power supply is interrupted. Among volatile memory devices, dynamic random access memory (DRAM) is used in various fields, such as mobile systems, servers, graphics units, etc.

SUMMARY

Embodiments of the present disclosure provide a memory device capable of supporting a metadata mode with improved function.

According to the memory device of the present disclosure, dirty metadata and information on a location at which the dirty metadata is to be stored in a metadata region are separately managed. Thus, the performance of the metadata mode is enhanced.

According to an aspect of the present disclosure, a memory device may include: a memory bank including a plurality of memory cells; and a bank register corresponding to the memory bank, wherein the memory bank may include: a main data region configured to store user data; and a metadata region configured to store metadata corresponding to the user data. The bank register may include: a metadata register configured to cache the metadata to be stored in the metadata region; and a dirty bitmap including location information indicating where the metadata is to be stored in the metadata region.

The metadata register may include a plurality of sub-registers configured to store a plurality of metadata corresponding to a plurality of user data, and the dirty bitmap may include a plurality of dirty bits corresponding to the plurality of sub-registers.

A plurality of different columns of the memory bank may be allocated for the user data, and a same column, among the plurality of different columns, may be allocated for the metadata corresponding to the user data.

The memory device may further include a store management circuit configured to: cache dirty metadata in a sub-register selected from the plurality of sub-registers in response to a write command; and change, among the plurality of bits included in the dirty bitmap, a bit value of a dirty bit corresponding to the selected sub-register in which the dirty metadata is stored.

The store management circuit is further configured to store the dirty metadata cached in the selected sub-register in response to a store-dirty command.

The store management circuit is configured to restrict data cached in a sub-register, which is not selected among the plurality of sub-registers, from being stored in the metadata region in response to the store-dirty command.

The store management circuit is further configured to initialize the bit value of the dirty bit corresponding to the selected sub-register after the metadata cached in the selected sub-register is stored in the metadata region.

The store management circuit is further configured to store the dirty metadata cached in the selected sub-register and data cached in non-selected sub-registers that are not selected from the plurality of sub-registers, in the metadata region in response to a store command.

The store management circuit is further configured to initialize the bit value of the dirty bit corresponding to the selected sub-register after the dirty metadata cached in the selected sub-register and the data cached in non-selected the sub-registers.

The memory device may further include a load management circuit configured to: load the metadata stored in the metadata region to the plurality of sub-registers in response to a load command; and load clean metadata stored in the metadata region to non-selected sub-registers that are not selected from the plurality of sub-registers.

The load management circuit may be configured to restrict the metadata stored in the metadata region from being loaded to the selected sub-register in which the dirty metadata is cached.

The load management circuit may be configured to maintain the bit value of the dirty bit corresponding to the selected sub-register after the clean metadata stored in the metadata region is loaded to the non-selected sub-registers.

According to another aspect of the present disclosure, a memory system may include: a memory device configured to store user data and metadata corresponding to the user data; and a memory controller configured to control the memory device, wherein the memory device may include: a memory bank including a plurality of memory cells; and a bank register corresponding to the memory bank. The memory bank may include: a main data region configured to store the user data; and a metadata region configured to store the metadata corresponding to the user data. The bank register may include: a metadata register configured to cache the metadata to be stored in the metadata region; and a dirty bitmap including location information indicating where the metadata is to be stored in the metadata region.

The memory controller may include: a dirty register bitmap including information about whether dirty metadata is stored in the metadata register; and a scheduler configured to schedule commands to be provided to the memory controller based on the dirty register bitmap.

The scheduler may be further configured to transmit a store-dirty command to the memory device when the dirty metadata is cached in the metadata register and a load command has not been previously transmitted to the memory device.

The metadata register may include a plurality of sub-registers configured to store a plurality of metadata corresponding to the user data, and the memory device may be further configured to store the dirty metadata cached in a sub-register, which is selected from the plurality sub-registers, in the metadata region in response to the store-dirty command, and restrict data cached in a sub-register, which is not selected from the sub-registers, from being stored in the metadata region.

The scheduler may be configured to transmit a store command to the memory device when the dirty metadata is cached in the metadata register and a load command has been previously transmitted to the memory device.

The metadata register may include a plurality of sub-registers configured to store a plurality of metadata corresponding to a plurality of user data, and the memory device may be further configured to store the dirty metadata cached in a sub-register that is selected from the plurality of sub-registers and the metadata cached in a sub-register, which is not selected among the plurality of sub-registers, in the metadata region in response to the store command.

The scheduler may be configured to omit a transmission of a store-dirty command and a store command when the dirty metadata is not cached in the metadata register.

According to another aspect of the present disclosure, a method of operating a memory system including a memory device and a memory controller controlling the memory device, the method including: enabling the memory controller to transmit an active command to the memory device to activate a selected row of a selected memory bank; enabling the memory controller to transmit a write command to store user data in the selected memory bank; enabling the memory controller to selectively transmit a store-dirty command or a store command to the memory device, the store-dirty command being transmitted based on dirty metadata being stored in a metadata register in which metadata with respect to the user data is stored, and the store command being transmitted based on the memory controller having previously transmitted a load command to the memory device; and enabling the memory controller to transmit a precharge command to the memory device.

According to another aspect of the present disclosure, a method of controlling a memory device that includes a plurality of memory cells constituting a memory bank, and a bank register corresponding to the memory bank, the method including: activating a selected row of the memory bank based on an active command; and executing a write operation in metadata mode without performing a load operation of loading metadata from the memory bank to the bank register after the selected row of the memory bank is activated, wherein the write operation in the metadata mode may include writing only dirty metadata cached in the register into a metadata region of the memory bank, based on a dirty bit map indicating locations of the dirty metadata stored in the metadata region of the memory bank.

BRIEF DESCRIPTION OF THE FIGURES

The above and other objects and features of the present disclosure will become apparent by describing in detail embodiments thereof with reference to the accompanying drawings.

FIG. 6 is a view illustrating data stored in the metadata region of the memory bank of FIG. 5;

DETAILED DESCRIPTION

Figure 1:
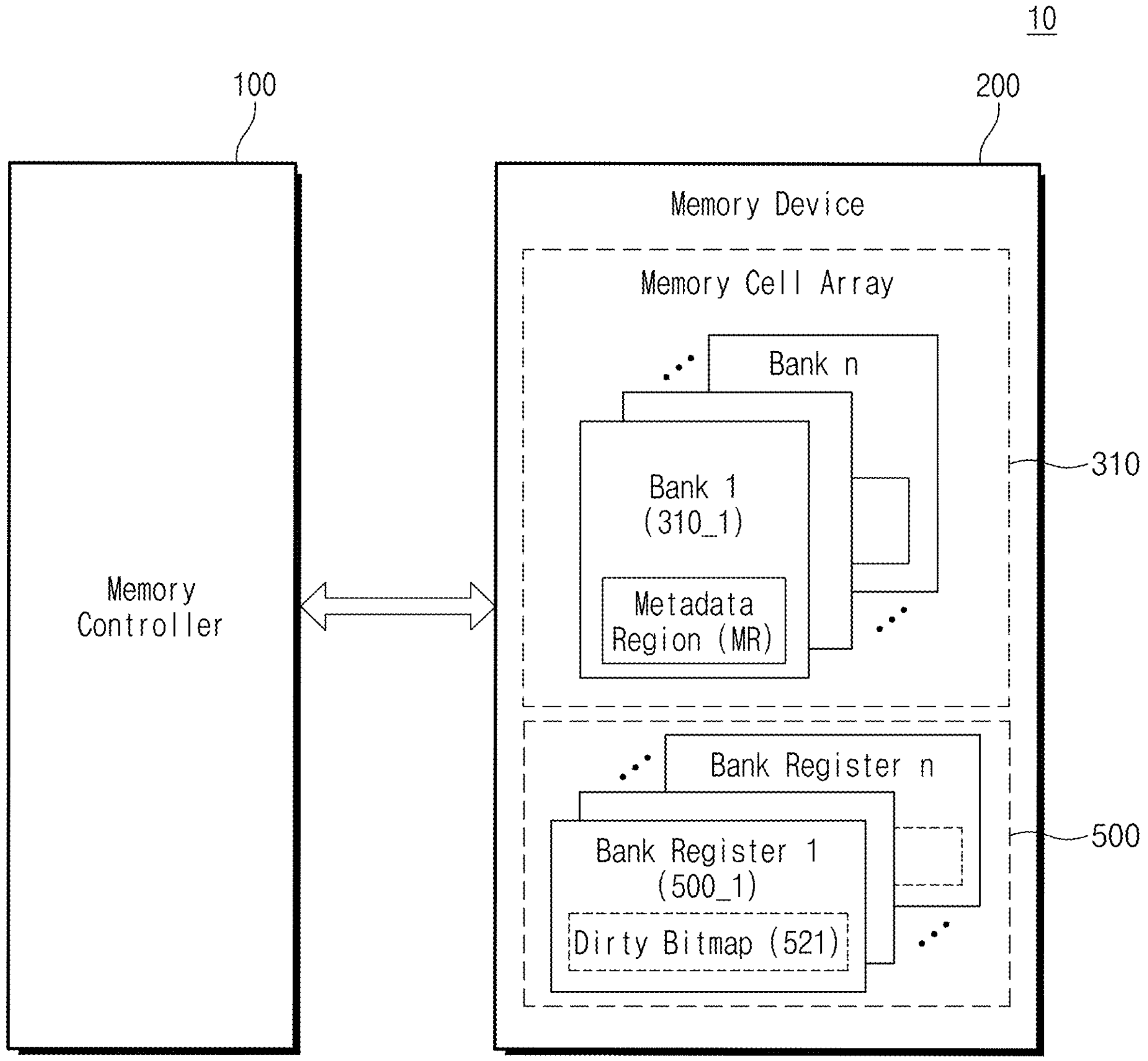
FIG. 1 is a block diagram illustrating a memory system according to one or more embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In the present disclosure, the expression "restricting data from being stored" may encompass an embodiment in which at least one item of the data is not stored while one or more items of the data are stored, and another embodiment in which none of the data is not stored.

[A Memory System that Manages Dirty Metadata Separately]

FIG. 1 is a block diagram illustrating a memory system 10 according to one or more embodiments of the present disclosure.

The memory system 10 may support a metadata mode. In the present disclosure, the metadata mode may refer to a mode that stores both user data and metadata in a memory device 200. The metadata may be used to improve performance or enhance security of a memory device. For example, the metadata may be error correction codes or parity data to perform error correction operations, memory addresses, control signals, and information used for managing data storage. User data may refer to primary information stored in the memory device that users or applications intend to read or write. User data may be a main content that the memory device is configured to store and manage, while metadata serves a supporting role of improving performance and security of the memory device.

In addition, the memory system 10 according to the present disclosure may cache dirty metadata in a bank register. Further, the memory system 10 may separately manage the dirty metadata and location information where the dirty metadata is to be stored in a metadata region of a memory bank. The dirty metadata may refer to metadata requested to be changed among the metadata stored in the metadata region. For example, metadata that has been modified and temporarily stored in a bank register but not yet permanently stored in a memory bank of the memory system 10 may be referred to as dirty metadata. Accordingly, the memory system 10 may effectively perform an operation of storing the dirty metadata cached in the bank register into the metadata region of the memory bank or an operation of loading the metadata stored in the metadata region of the memory bank to the bank register in the metadata mode.

Referring to FIG. 1, the memory system 10 may include a memory controller 100 and the memory device 200.

The memory controller 100 may control the memory device 200. As an example, the memory controller 100 may control the memory device 200 in response to a request of a processor supporting various applications, such as a server application, a personal computer (PC) application, a mobile application, etc. For example, the memory controller 100 may be part of a host including a processor and may control the memory device 200 in response to a request of the processor. The memory controller 100 may be implemented by a system-on-chip (SoC).

The memory controller 100 may transmit a command and/or an address to the memory device 200 to control the memory device 200. The memory controller 100 may transmit an active command, a write command, a read command, and a precharge command to the memory device 200. In addition, the memory controller 100 may transmit, for example, a store command, a store-dirty command, and a load command, which are described below, to the memory device 200.

The memory controller 100 may transmit data to the memory device 200 or may receive data from the memory device 200.

As an example, during a write operation, the memory controller 100 may transmit the user data and metadata corresponding to the user data to the memory device 200. As an example, during a read operation, the memory controller 100 may receive the user data and the metadata corresponding to the user data from the memory device 200.

As an example, when the metadata is error correction code (ECC) parity data and an ECC engine is implemented in the memory device 200, the metadata may be transmitted and received between the metadata region MR of the memory device 200 and the bank register corresponding to the metadata region MR, but not between the memory controller 100 and the memory device 200.

The memory device 200 may receive the data from the memory controller 100 and may store the data. The memory device 200 may read out the stored data in response to a request of the memory controller 100 and may transmit the read-out data to the memory controller 100.

According to one or more embodiments, the memory device 200 may be a memory device including volatile memory cells. As an example, the memory device 200 may be various DRAM devices such as a double data rate synchronous dynamic random access memory (DDR SDRAM), DDR2 SDRAM, DDR3 SDRAM, DDR4 SDRAM, DDR5 SDRAM, DDR6 SDRAM, a low power double data rate (LPDDR) SDRAM, LPDDR2 SDRAM, LPDDR3 SDRAM, LPDDR4 SDRAM, LPDDR4X SDRAM, LPDDR5 SDRAM, LPDDR6 SDRAM, a graphics double data rate synchronous graphics random access memory (GDDR SGRAM), GDDR2 SGRAM, GDDR3 SGRAM, GDDR4 SGRAM, GDDR5 SGRAM, GDDR6 SGRAM, etc.

In addition, according to one or more embodiments, the memory device 200 may be a memory device in which DRAM dies are stacked, such as a high bandwidth memory (HBM), HBM2, HBM3, etc.

In addition, according to one or more embodiments, the memory device 200 may be a memory module such as a dual in-line memory module (DIMM). For example, the memory device 200 may be a registered DIMM (RDIMM), a load reduced DIMM (LRDIMM), an unbuffered DIMM (UDIMM), a fully buffered DIMM (FB-DIMM), or a small outline DIMM (SO-DIMM), however, this is merely an example. According to one or more embodiments, the memory device 200 may be any other memory module such as a single in-line memory module (SIMM).

In addition, according to one or more embodiments, the memory device 200 may be an SRAM device, a NAND flash memory device, a NOR flash memory device, a RRAM device, a FRAM device, a TRAM device, an MRAM device, etc.

The memory device 200 may include a memory cell array 310 and a bank register group 500.

The memory cell array 310 may include a plurality of memory banks, and each of the memory banks may include memory cells to store the data. In the present disclosure, for the convenience of explanation, it is assumed that each memory bank includes DRAM cells, however, this is merely an example. According to one or more embodiments, each of the memory banks may be implemented to include the volatile memory cells rather than the DRAM cells. In addition, the memory banks may be implemented to include the same types of memory cells or may be implemented to include different types of memory cells.

Each of the memory banks may include the metadata region MR. The metadata region MR may refer to an area allocated to store the metadata among regions included in the memory bank.

As an example, a first memory bank 310_1 may include a plurality of columns, and some of the plurality of columns may be allocated to the metadata region MR. In this case, it may be referred that some carved columns are used as the metadata region MR. According to one or more embodiments, the first memory bank 310_1 may include a plurality of rows, and some of the plurality of rows may be allocated to the metadata region MR. In this case, it may be referred that some carved rows are used as the metadata region MR.

The bank register group 500 may include a plurality of bank registers. Each bank register may cache the metadata to be stored in a metadata region of a corresponding memory bank. In addition, each bank register may cache the metadata loaded from the metadata region of the corresponding memory bank. In the present disclosure, the expression "caching the metadata" may refer to "temporarily storing metadata".

As an example, a first bank register 500_1 may correspond to the first memory bank 310_1 and may cache the metadata to be stored in the metadata region MR of the first memory bank 310_1 or the metadata loaded from the metadata region MR of the first memory bank 310_1.

According to one or more embodiments, each of the bank registers may include a dirty bitmap. The dirty bitmap may include location information where the dirty metadata is to be stored in the metadata region MR of the memory bank. In other words, the dirty bitmap may be used to manage the location information where the dirty metadata is to be stored in the metadata region MR of the memory bank. Each bit in the dirty bitmap may represent a block or segment of the memory device 200. For example, in the dirty bit map, a bit set to 1 may indicate that a corresponding block is dirty (i.e., a bit that has been modified and temporarily stored but not yet saved to a memory bank or permanent storage), and a bit set to 0 may indicates that the corresponding block is clean (i.e., a bit that matches the data stored in a memory bank or permanent storage).

As an example, the first bank register 500_1 may include a dirty bitmap 521, and the dirty bitmap 521 may include location information where the dirty metadata cached in the first bank register 500_1 is to be stored in the metadata region MR of the first memory bank 310_1.

The memory device 200 according to the present disclosure may effectively perform a write operation in the metadata mode or a load operation in the metadata mode using the dirty bitmap. In the present embodiment, the write operation in the metadata mode may refer to an operation of storing the dirty metadata cached in the bank register in the metadata region MR of the memory bank. The load operation in the metadata mode may refer to an operation of loading the metadata stored in the metadata region MR of the memory bank to the corresponding bank register.

The memory device 200 may perform a store-dirty operation that stores only the dirty metadata in the metadata region using the dirty bitmap among the metadata cached in the bank register. As an example, as describe below, when at least one bit of the dirty bitmap is 1 and the operation of loading the metadata from the metadata region MR to the bank register has not been performed previously, the memory system 10 may perform the store-dirty operation.

In this case, only the metadata marked as "dirty" (e.g., a bit set to "1") by the dirty bitmap, among the metadata cached in the bank register, may be stored in metadata region MR. Metadata not marked as dirty (e.g., a bit set to "0") by the dirty bitmap may not be stored in the metadata region MR. Since only the dirty metadata is selectively stored in the metadata region MR using the dirty bitmap, the store-dirty operation may be referred to as a masked write operation.

In addition, the memory device 200 may perform a store operation that stores the metadata cached in the bank register in the metadata region MR using the dirty bitmap. As an example, as describe below, when at least one bit of the dirty bitmap is 1 and the operation of loading the metadata from the metadata region MR to the bank register has been performed previously, the memory system 10 may perform the store operation.

In this case, the metadata cached in the bank register may be stored in the metadata region MR of the memory bank. That is, metadata marked as dirty by the dirty bitmap and metadata not marked as dirty metadata by the dirty bitmap may be stored in the metadata region MR of the memory bank.

In addition, the memory device 200 may omit the store-dirty operation or the store operation. As an example, during the write operation, the memory device 200 may store the user data in the memory bank and may cache the metadata corresponding to the user data in the bank register, and then the memory device 200 may terminate the write operation. As an example, as described below, when all bits of the dirty bitmap are '0', the memory system 10 may omit the store-dirty operation or the store operation.

In addition, the memory system 10 may perform a load-clean operation that loads only clean metadata among the metadata stored in the metadata region using the dirty bitmap. In this case, the clean metadata may refer to the metadata that are not requested to be changed among metadata stored in the metadata region MR.

In this case, only clean data among the metadata stored in the metadata region MR of the memory bank may be loaded to the bank register. That is, among the metadata stored in the metadata region MR of the memory bank, the metadata stored in a location that is marked as the dirty metadata by the dirty bitmap may not be loaded to the bank register, and among the metadata stored in the metadata region MR of the memory bank, only the clean data stored in a location that is not marked as the dirty metadata by the dirty bitmap may be loaded to the bank register. Since only the clean metadata is selectively loaded from the metadata region MR to the bank register using the dirty bitmap, the load-clean operation may be referred to as a masked load operation.

As described above, the memory system 10 according to the present embodiment may support the metadata mode and may separately manage the dirty metadata and the location information where the dirty metadata is to be stored in the metadata region MR of the memory bank. Accordingly, the memory system 10 may effectively perform the write operation in the metadata mode or the load operation in the metadata mode.

Figure 2:
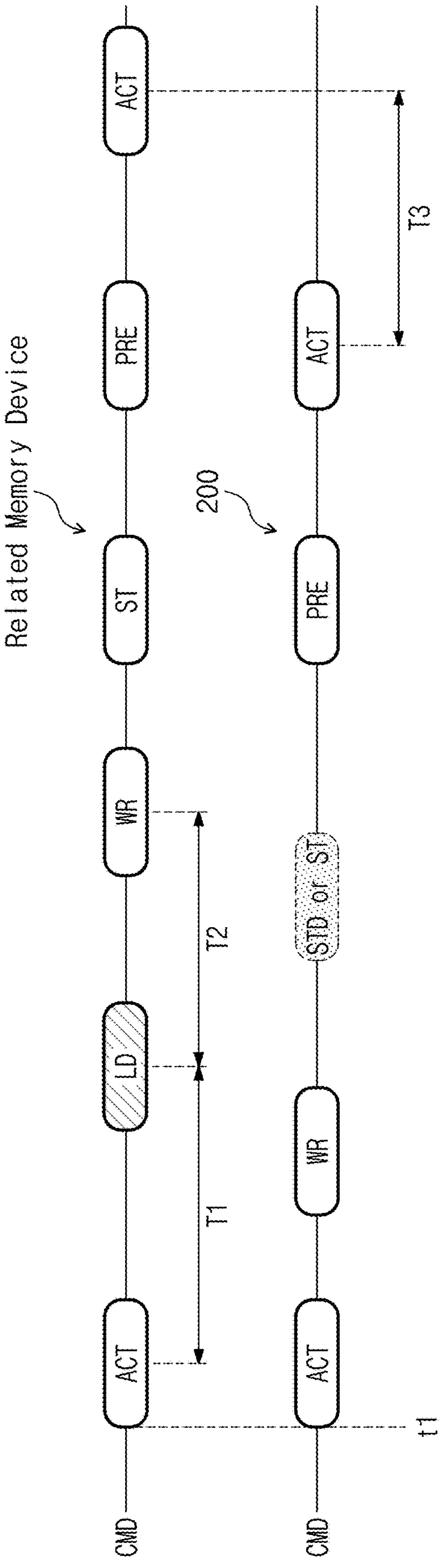
FIG. 2 is a view illustrating an operation of a metadata mode according to one or more embodiments of the present disclosure.

FIG. 2 is a view illustrating an operation in a metadata mode according to one or more embodiments of the present disclosure. As an example, FIG. 2 shows the write operation in the metadata mode. For the convenience of explanation, it is assumed that both a related memory device and the memory device 200 (refer to FIG. 1) according to the present embodiment receive an active command ACT at a first time point t1.

Referring to FIG. 2, during the write operation in the metadata mode, the related memory device may receive the active command ACT at the first time point t1. Then, the related memory device may sequentially receive a load command LD, a write command WR, a store command ST, and a precharge command PRE.

As shown in FIG. 2, the related memory device may be required to receive the load command LD before receiving the write command WR. That is, before executing the write operation, the related memory device may be required to perform the load operation that loads the metadata stored in the memory bank to the bank register.

In more detail, a size of the metadata is generally smaller than a size of the user data. Accordingly, plural metadata corresponding to different user data are stored together.

As an example, for the convenience of explanation, it is assumed that 32 bytes of data are stored in memory cells corresponding to one row and one column. In addition, it is assumed that the size of the user data is 32 bytes and the size of the metadata is 2 bytes. In this case, 16 metadata corresponding to 16 user data different from each other may be stored together in the memory cells corresponding to one row and one column.

Accordingly, when there is a request to change the metadata corresponding to one user data, the metadata requested to be changed is required to be loaded into the bank register along with other metadata stored together before the write operation. In a case where the load operation is not performed and the write operation is performed, the other metadata stored together with the metadata requested to be changed may be damaged by being overwritten by invalid data.

Thus, as shown in FIG. 2, the related memory device may receive the load command LD after receiving the active command ACT. Therefore, it takes a first time T1 to perform the load operation. In addition, the related memory device may receive the write command WR after receiving the load command LD. Thus, it takes a second time T2 to convert the load operation into the write operation. Consequentially, the related memory device requires a relatively long time for the write operation in the metadata mode.

However, according to the embodiment, the memory device 200 shown in FIG. 1 may separately manage the location information of where the dirty metadata is stored in the metadata region MR using the dirty bitmap.

The memory device 200 may support the store-dirty operation using the location information with respect to the dirty metadata. As an example, the memory device 200 may store the user data in the corresponding memory bank in response to the write command WR and may perform the store-dirty operation that overwrites only the dirty metadata in the metadata region MR in response to the store-dirty command STD. Accordingly, when compared with the related memory device, the memory device 200 according to the embodiment does not require the first time T1 and the second time T2 to perform the write operation, and consequently, a time required to perform the write operation may be reduced by a third time T3.

In addition, the memory device 200 according to the embodiment may receive the store command ST instead of the store-dirty command STD and may perform the store operation. Further, the memory device 200 according to the embodiment may omit the store-dirty operation or the store operation. Therefore, a time required to perform the write operation in the metadata mode may be further reduced.

Hereinafter, various embodiments of the memory system according to the present embodiment will be described in detail.

[A Memory Device that Performs a Write Operation in a Metadata Mode]

Figure 3:
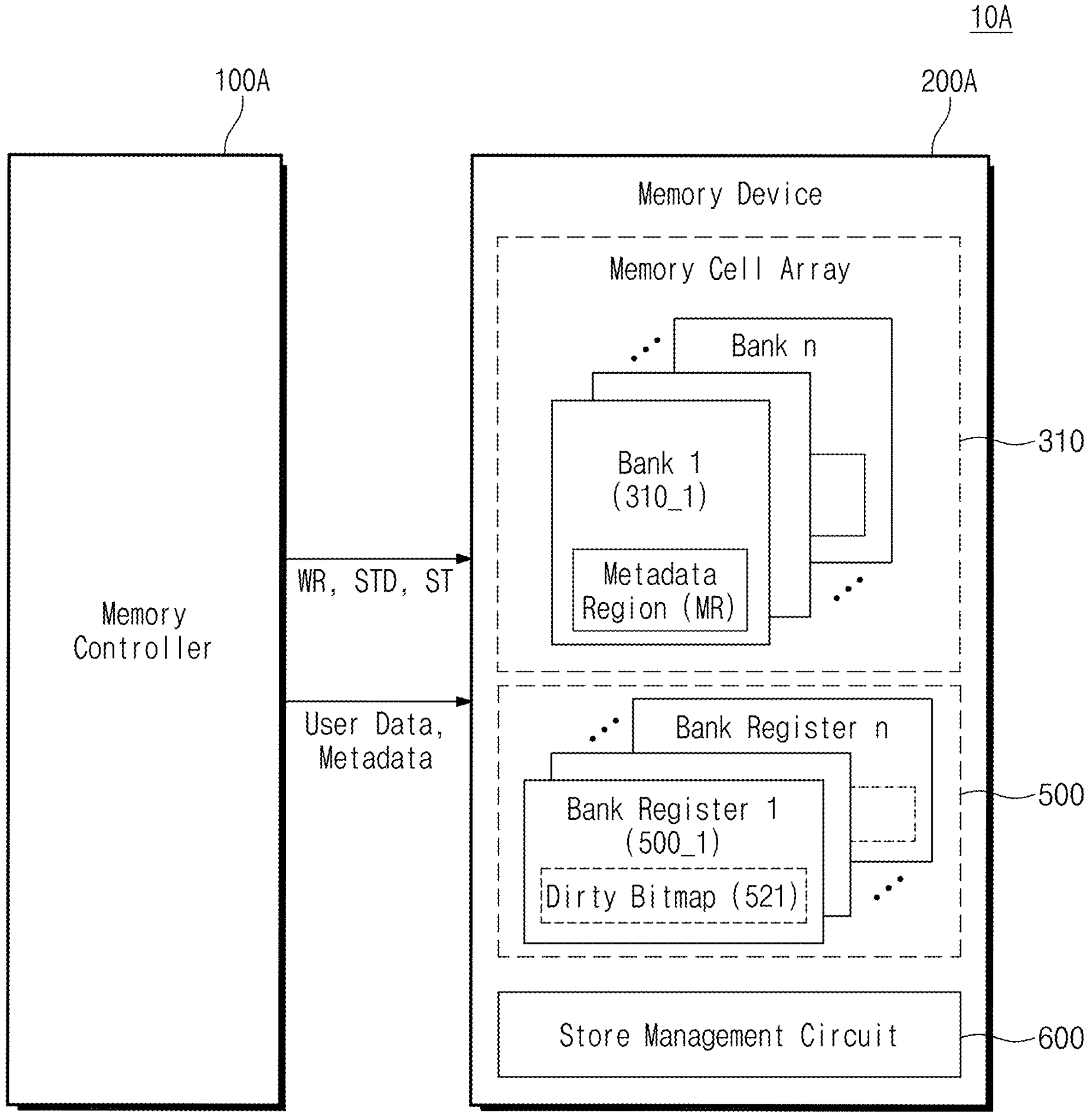
FIG. 3 is a block diagram illustrating a memory system according to one or more embodiments of the present disclosure.

FIG. 3 is a block diagram illustrating a memory system 10A according to one or more embodiments of the present disclosure. The memory system 10A of FIG. 3 is similar to the memory system 10 of FIG. 1. Accordingly, in FIG. 3, the same/similar reference numerals denote the same/similar elements in FIG. 1, and thus, detailed descriptions of the same/similar elements will be omitted.

Referring to FIG. 3, the memory system 10A may include a memory controller 100A and a memory device 200A. The memory device 200A may include a memory cell array 310, a bank register group 500, and a store management circuit 600.

The memory cell array 310 may include a plurality of memory banks, and each of the memory banks may include a metadata region MR. The metadata region MR may correspond to some rows of a plurality of rows of the memory bank or some columns of a plurality of columns of the memory bank.

The bank register group 500 may include a plurality of bank registers, and each of the bank registers may include a dirty bitmap. The dirty bitmap may include location information where dirty metadata is to be stored in the metadata region MR.

The store management circuit 600 may control an operation that stores the metadata stored in each bank register into a metadata region MR of a corresponding memory bank.

According to one or more embodiments, during the write operation in the metadata mode, the memory device 200A may receive a write command WR from the memory controller 100A. The memory device 200A may store user data into the corresponding memory bank in response to the write command WR.

During the write operation in the metadata mode, the memory device 200A may receive a store-dirty command STD from the memory controller 100A. Responsive to the store-dirty command STD, the store management circuit 600 may control the memory device 200A to perform a store-dirty operation. In this case, the store management circuit 600 may control the memory device 200A with reference to the dirty bitmap so that only the dirty metadata cached in the bank register is stored in a corresponding metadata region MR.

During the write operation in the metadata mode, the memory device 200A may receive a store command ST from the memory controller 100A. Responsive to the store command ST, the store management circuit 600 may control the memory device 200A to perform a store operation. In this case, the store management circuit 600 may control the memory device 200A with reference to the dirty bitmap to store the dirty metadata cached in the bank register as well as the metadata other than the dirty metadata in the metadata region MR.

During the write operation in the metadata mode, the memory device 200A may not receive the store-dirty command STD or the store command ST from the memory controller 100A. That is, during the write operation in a corresponding metadata mode, the store-dirty operation or the store operation may be omitted. In this case, the dirty metadata may continue to be temporarily stored in the bank register.

As described above, the memory system 10A according to the embodiment may separately manage the location information where the dirty metadata is to be stored in the metadata region MR of the memory bank using the dirty bitmap. Accordingly, the write operation may be effectively performed in the metadata mode.

Figure 4:
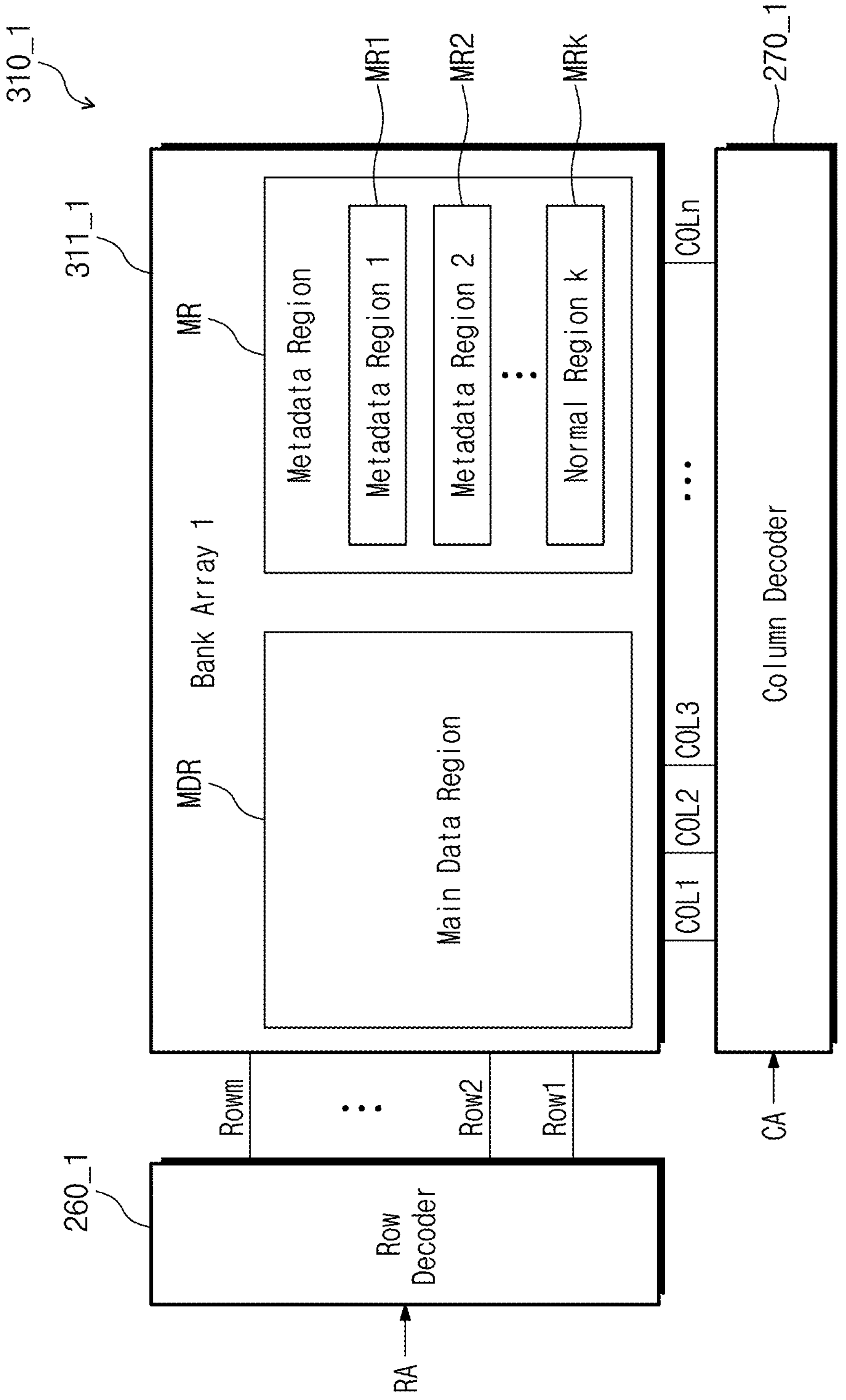
FIG. 4 is a block diagram illustrating a memory bank according to one or more embodiments of the present disclosure.

FIG. 4 is a block diagram illustrating a memory bank 310_1 according to one or more embodiments of the present disclosure. The memory bank 310_1 of FIG. 4 may correspond to the first memory bank 310_1 of FIG. 3.

Referring to FIG. 4, the first memory bank 310_1 may include a first memory bank array 311_1, a row decoder 260_1, and a column decoder 270_1.

The first memory bank array 311_1 may include a plurality of memory cells. The first memory bank array 311_1 may include a main data region MDR and a metadata region MR.

The main data region MDR may refer to an area allocated to store user data (or user-generated data) and/or application-specific data in first memory bank array 311_1. According to one or more embodiments, the main data region MDR may refer to an area excluding an area allocated to the metadata region MR in the first memory bank array 311_1.

The metadata region MR may refer to an area allocated to store the metadata in the first memory bank array 311_1. The metadata region MR may include first to k-th metadata regions MR1 to MRk.

The row decoder 260_1 may activate one row of a plurality of rows ROW1 to ROWm in response to a row address RA. As an example, each of the rows ROW1 to ROWm may correspond to a word line.

The column decoder 270_1 may activate one column of a plurality of columns COL1 to COLn in response to a column address CA. As an example, each of the columns COL1 to COLn may correspond to a column selection line (hereinafter, referred to as CSL). However, this is merely an example, and according to one or more embodiments, each of the columns COL1 to COLn may correspond to a bit line.

According to one or more embodiments, the metadata region MR may be allocated by a column carved-out scheme. That is, some columns of the columns COL1 to COLn may be allocated to the metadata region MR.

As an example, when it is assumed that sixty-first to sixty-fourth columns COL61 to COL64 are allocated to the metadata region MR, the memory cells corresponding to the sixty-first column COL61 may be defined as a first metadata region MR1. Similarly, the memory cells corresponding to the sixty-second to sixty-fourth columns COL62 to COL64 may be allocated to second to fourth metadata regions MR2 to MR4, respectively.

According to one or more embodiments, the metadata region MR may be allocated by a row carved-out scheme. That is, some rows of the rows ROW1 to ROWm may be allocated to the metadata region MR.

As an example, when it is assumed that sixty-first to sixty-fourth rows ROW61 to ROW64 are allocated to the metadata region MR, the memory cells corresponding to the sixty-first row ROW61 may be defined as the first metadata region MR1. Similarly, the memory cells corresponding to the sixty-second to sixty-fourth rows ROW62 to ROW64 may be defined as the second to fourth metadata regions MR2 to MR4, respectively.

In the present embodiment, for the convenience of explanation, it is assumed that the metadata region MR is allocated by the column carved-out scheme.

Figure 5:
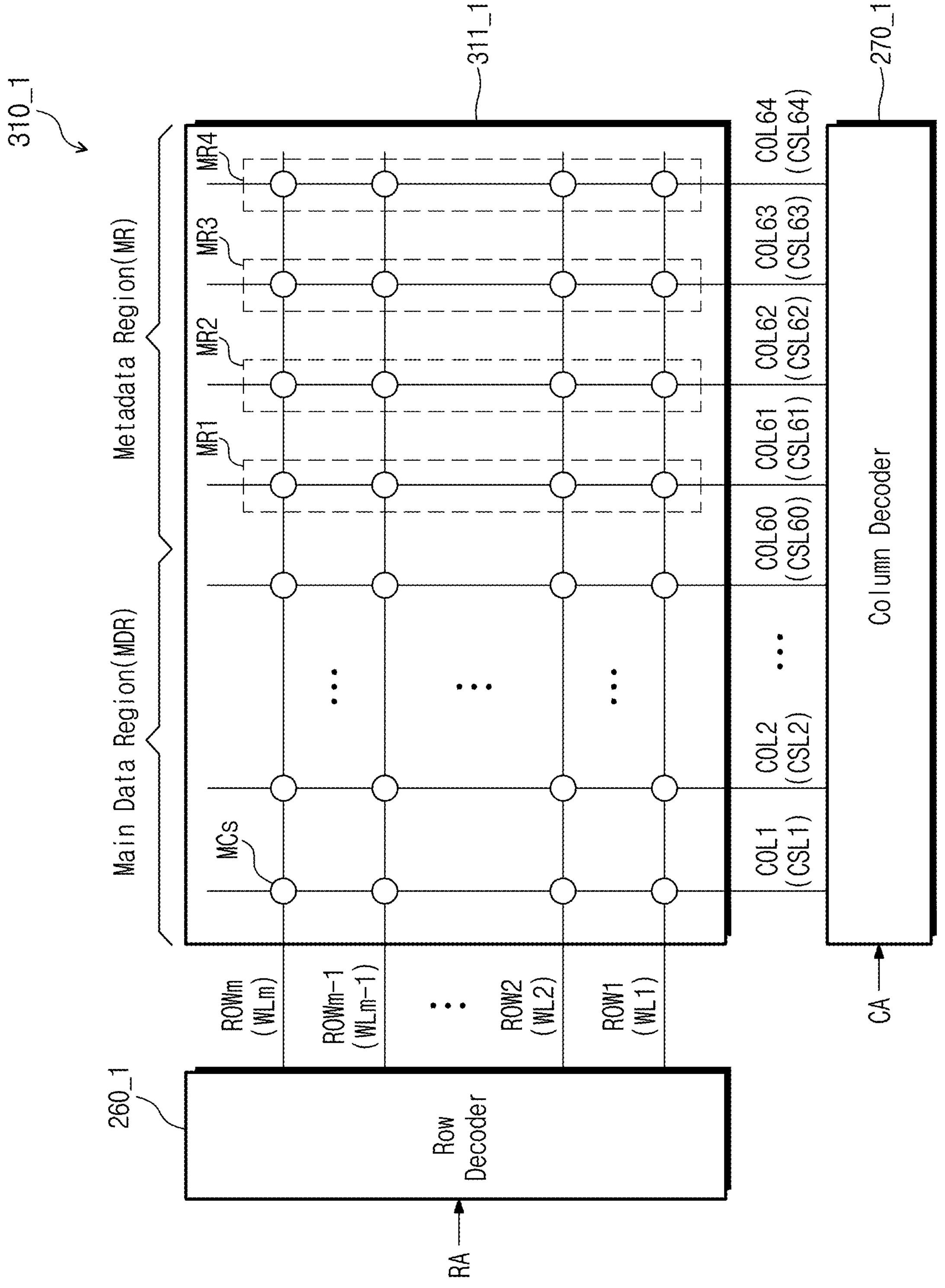
FIG. 5 is a conceptual view illustrating a memory bank including a metadata region allocated by a column carved-out scheme according to one or more embodiments of the present disclosure.

FIG. 5 is a conceptual view illustrating the memory bank including the metadata region allocated by the column carved-out scheme according to one or more embodiments of the present disclosure. FIG. 6 is a view illustrating the data stored in the metadata region of the memory bank of FIG. 5. The memory bank 310_1 described with reference to FIGS. 5 and 6 may correspond to, for example, the first memory bank 310_1 of FIGS. 3 and 4.

In FIGS. 5 and 6, for the convenience of explanation, it is assumed that the first memory bank 310_1 includes first to sixty-fourth column selection lines CSL1 to CSL64 and memory cells corresponding to the sixty-first to sixty-fourth column selection lines CSL61 to CSL64 are allocated to first to fourth metadata regions MR1 to MR4. In addition, it is assumed that 32 bytes of data are stored in memory cells selected by one word line and one column selection line. Further, it is assumed that 2 bytes of metadata correspond to 32 bytes of user data.

Referring to FIG. 5, the first memory bank 310_1 may include the first memory bank array 311_1, the row decoder 260_1, and the column decoder 270_1.

The first memory bank array 311_1 may be electrically connected to a plurality of word lines WL1 to WLm and the first to sixty-fourth column selection lines CSL1 to CSL64 and may include the memory cells. The word lines WL1 to WLm may be defined as the rows ROW1 to ROWm, and the column selection lines CSL1 to CSL64 may be defined as the columns COL1 to COL64.

A portion of the first memory bank array 311_1 may be allocated to the main data region MDR, and the other portion of the first memory bank array 311_1 may be allocated to the metadata region MR.

As an example, the memory cells corresponding to first to sixtieth columns COL1 to COL60 may be allocated to the main data region MDR as shown in FIG. 5. The user data may be stored in the memory cells allocated to the main data region MDR.

Referring to FIGS. 5 and 6, in the main data region MDR, 32 bytes of user data may be stored in the memory cells corresponding to one row and one column.

As an example, 32 bytes of user data may be stored in the memory cells corresponding to a first row ROW1 and the first column COL1. Similarly, among the memory cells corresponding to the first row ROW1, 32 bytes of user data may be stored in each of the memory cells corresponding to the second to sixtieth columns COL2 to COL60. Similarly, among the memory cells corresponding to a second row ROW2, 32 bytes of user data may be stored in each of the memory cells corresponding to first to sixtieth columns COL1 to COL60.

In addition, as an example, the memory cells corresponding to the sixty-first to sixty-fourth columns COL61 to COL64 may be allocated to the metadata region MR as shown in FIG. 5. As an example, the memory cells corresponding to the sixty-first column COL61 may be allocated to the first metadata region MR1. In addition, the memory cells corresponding to the sixty-second to sixty-fourth columns COL62 to COL64 may be allocated to the second to fourth metadata regions MR2 to MR4, respectively. The metadata may be stored in the memory cells allocated to the metadata region MR.

Referring to FIGS. 5 and 6, in the metadata region MR, 32 bytes of metadata may be stored in the memory cells corresponding to one row and one column. In other words, 16 metadata corresponding to 16 different user data may be stored together in the memory cells corresponding to one row and one column. For example, a plurality of different columns of the first memory bank array 311_1 are allocated for storing the user data, and each of columns of the first memory bank array 311_1 except for the plurality of different columns is allocated for storing the metadata corresponding to a portion of the user data.

As an example, 16 metadata may be stored in the memory cells corresponding to the first row ROW1 and the sixty-first column COL61. The 16 metadata may be 16 metadata corresponding to 16 user data stored in the memory cells corresponding to the first to sixteenth columns COL1 to COL16 among the memory cells corresponding to the first row ROW1. That is, the metadata corresponding to the user data of the first row ROW1 and the first column COL1 to the metadata corresponding to the user data of the first row ROW1 and the sixteenth column COL16 may be stored together in the memory cells corresponding to the first row ROW1 and the sixty-first column COL61.

In this case, among the memory cells corresponding to the sixty-first column COL61, the metadata corresponding to the user data of the first column selection line CSL1, the metadata corresponding to the user data of a second column selection line CSL2, . . . , the metadata corresponding to the user data of a fifteenth column selection line CSL15, and the metadata corresponding to the user data of a sixteenth column selection line CSL16 may be stored in a $1^{st}$ part, a $2^{nd}$ part, . . . , a $15^{th}$ part, a $16^{th}$ part, respectively. As an example, the 32 bytes of memory cells allocated to the sixty-first column COL61 may be divided into 16 parts, e.g., the $1^{st}$ part to the 16th part, to each of which 2 bytes are allocated. The 2 bytes of memory cells allocated to each of the first to sixteenth parts may be set to store the metadata related to the corresponding user data.

Similar to this, the metadata corresponding to the user data of the first row ROW1 and a seventeenth column COL17 to the metadata corresponding to the user data of the first row ROW1 and a thirty-second column COL32 may be stored together in the memory cells corresponding to the first row ROW1 and the sixty-second column COL62. In addition, the metadata corresponding to the user data of the first row ROW1 and a thirty-third column COL33 to the metadata corresponding to the user data of the first row ROW1 and a forty-eighth column COL48 may be stored together in the memory cells corresponding to the first row ROW1 and a sixty-third column COL63. Further, the metadata corresponding to the user data of the first row ROW1 and a forty-ninth column COL49 to the metadata corresponding to the user data of the first row ROW1 and the sixtieth column COL60 may be stored together in the memory cells corresponding to the first row ROW1 and the sixty-fourth column COL64.

In the present embodiment, among the memory cells corresponding to the sixty-fourth column COL64, the metadata corresponding to the user data of a forty-ninth column selection line CSL49, the metadata corresponding to the user data of a fiftieth column selection line CSL50, . . . , the metadata corresponding to the user data of a fifty-ninth column selection line CSL59, and the metadata corresponding to the user data of a sixtieth column selection line CSL60 may be stored in a $1^{st}$ part, a $2^{nd}$ part, . . . , an eleventh part, a twelfth part, respectively.

In this case, among the memory cells corresponding to the sixty-fourth column COL64, the metadata may not be stored in a thirteenth part to a sixteenth part. That is, the metadata may not be stored in some of the memory cells corresponding to the sixty-fourth column COL64. As an example, the thirteenth part to the sixteenth part of the memory cells corresponding to the sixty-fourth column COL64 may be set to spare registers.

Similarly, the metadata corresponding to the user data of the second row ROW2 and the first column COL1 to the metadata corresponding to the user data of the second row ROW2 and the sixteenth column COL16 may be stored together in the memory cells corresponding to the second row ROW2 and the sixty-first column COL61.

According to the above-describe scheme, the user data may be stored in the memory cells corresponding to one row and one column in the main data region MDR. In addition, the metadata corresponding to the user data may be stored in the memory cells corresponding to one row and one column in the metadata region MR.

Meanwhile, for the convenience of explanation, FIG. 5 shows a structure in which the columns corresponding to the main data region MDR are arranged adjacent to each other and the columns corresponding to the metadata region MR are arranged adjacent to each other. However, this is merely an example, and the present disclosure should not be limited thereto or thereby. As an example, a physical arrangement of the main data region MDR and the metadata region MR may be different from the conceptual diagram of FIG. 5. According to embodiments, the columns corresponding to the main data region MDR may be arranged physically spaced apart from each other. According to one or more embodiments, the columns corresponding to the metadata region MR may be arranged physically spaced apart from each other.

Figure 7:
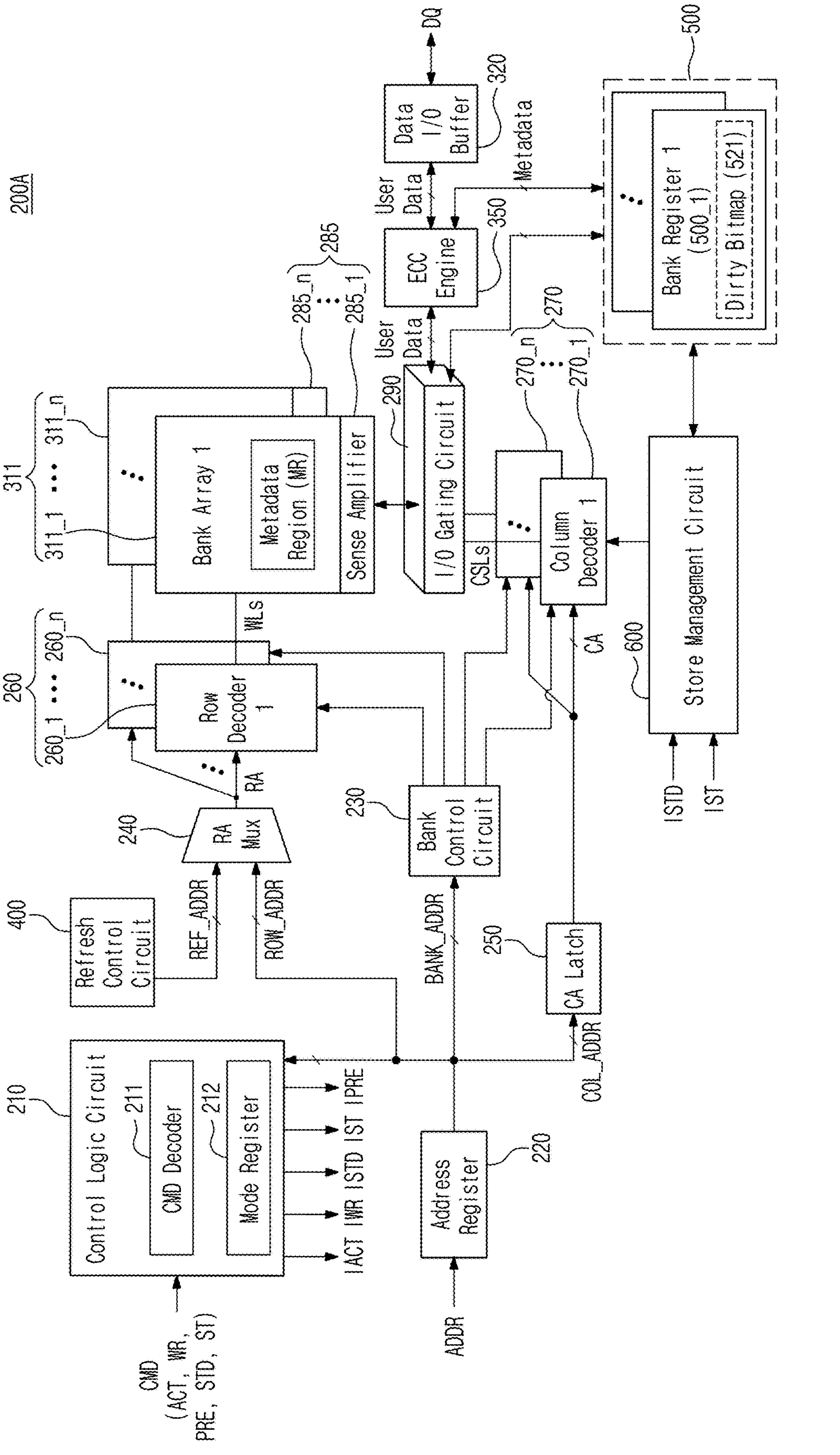
FIG. 7 is a block diagram illustrating a memory device according to one or more embodiments of the present disclosure.

FIG. 7 is a block diagram illustrating the memory device 200A according to one or more embodiments of the present disclosure. The memory device 200A of FIG. 7 may correspond to the memory device 200A of FIG. 3. For the convenience of explanation, it is assumed that the metadata region MR is allocated by the column carved-out scheme similar to FIGS. 5 and 6. In addition, it is assumed that the metadata is the ECC parity data.

Referring to FIG. 7, the memory device 200A may include a control logic circuit 210, an address register 220, a memory bank control logic 230, a refresh control circuit 400, a row address multiplexer 240, a column address latch 250, a row decoder group 260, a column decoder group 270, a memory bank array group 311, a sense amplifier group 285, an I/O gating circuit 290, an ECC engine 350, a data I/O buffer 320, a bank register group 500, and a store management circuit 600.

The memory bank array group 311 may include a plurality memory bank arrays 311_1 to 311_*n*. Each of the memory bank arrays 311_1 to 311_*n* may include the memory cells. As an example, each of the memory cells may be formed at a point where a corresponding word line intersects a corresponding bit line.

The row decoder group 260 may include a plurality of row decoders 260_1 to 260_*n*. Each of the row decoders 260_1 to 260_*n* may be connected to a corresponding memory bank array among the memory bank arrays 311_1 to 311_*n*.

The sense amplifier group 285 may include a plurality of sense amplifiers 285_1 to 285_*n*. Each of the sense amplifiers 285_1 to 285_*n* may be connected to a corresponding memory bank array among the memory bank arrays 311_1 to 311_*n*.

The column decoder group 270 may include a plurality of column decoders 270_1 to 270_*n*. Each of the column decoders 270_1 to 270_*n* may be connected to a corresponding memory bank array among the memory bank arrays 311_1 to 311_*n* via a corresponding sense amplifier.

The address register 220 may receive an address ADDR including a memory bank address memory bank_ADDR, a row address ROW_ADDR, and a column address COL_ADDR from the memory controller 100 or 100A (refer to FIGS. 1, 3). The address register 220 may provide the received memory bank address memory bank_ADDR to the memory bank control logic 230, may provide the received row address ROW_ADDR to the row address multiplexer 240, and may provide the received column address COL_ADDR to the column address latch 250.

The memory bank control logic 230 may generate memory bank control signals in response to the memory bank address memory bank_ADDR. As an example, the row decoder corresponding to the memory bank address memory bank_ADDR among the row decoders 260_1 to 260_*n* may be activated in response to the memory bank control signals. The column decoder corresponding to the memory bank address memory bank_ADDR among the column decoders 270_1 to 270_*n* may be activated in response to the memory bank control signals.

The row address multiplexer 240 may receive the row address ROW_ADDR from the address register 220 and may receive a refresh row address REF_ADDR from the refresh control circuit 400. The row address multiplexer 240 may selectively output the row address ROW_ADDR or the refresh row address REF_ADDR as a row address RA. The row address RA output from the row address multiplexer 240 may be applied to each of the row decoders 260_1 to 260_*n*.

The refresh control circuit 400 may sequentially increase or decrease the refresh row address REF_ADDR in response to refresh signals from the control logic circuit 210.

A row decoder selected by the memory bank control logic 230 among the row decoders 260_1 to 260_*n* may activate a word line corresponding to the row address RA output from the row address multiplexer 240. As an example, the selected row decoder may apply a word line driving voltage to the word line corresponding to the row address.

The column address latch 250 may receive the column address COL_ADDR from the address register 220 and may temporarily store the received column address COL_ADDR. In addition, for example, in a burst mode, the column address latch 250 may gradually increase the received column address COL_ADDR. The column address latch 250 may apply a column address CA obtained by temporarily storing or gradually increasing the column address COL_ADDR to each of the column decoders 270_1 to 270_*n*.

The column decoder activated by the memory bank control logic 230 among the column decoders 270_1 to 270_*n* may activate the sense amplifier 285_1 to 285_*n* corresponding to the memory bank address memory bank_ADDR and the column address COL_ADDR through the I/O gating circuit 290.

The I/O gating circuit 290 may include circuits that gate I/O data. In addition, the I/O gating circuit 290 may include data latches to store data output from the memory bank arrays 311_1 to 311_*n* and write drivers to write data in the memory bank arrays 311_1 to 311_*n*.

The data I/O buffer 320 may convert a data signal DQ into the user data during the write operation and may provide the user data to the ECC engine 350. The data I/O buffer 320 may convert the user data provided from the ECC engine 350 into the data signal DQ during the read operation.

The ECC engine 350 may perform an ECC encoding operation on the user data during the write operation and may generate the metadata that is the ECC parity data. As an example, the ECC engine 350 may provide the metadata to the bank register group 500 during the write operation. As an example, the ECC engine 350 may perform an ECC decoding operation on the user data and the metadata during the read operation.

The bank register group 500 may include the bank registers, and the metadata may be cached in a corresponding bank register among the bank registers.

Each of the bank registers may include the dirty bitmap. The dirty bitmap may include the location information where the dirty metadata is to be stored in the metadata region MR of the memory bank. As an example, the first bank register 500_1 may include the dirty bitmap 521, and the dirty bitmap 521 may include the location information where the dirty metadata cached in the first bank register 500_1 is to be stored in the metadata region MR of the first memory bank 310_1 (refer to FIG. 3).

The control logic circuit 210 may control an operation of the memory device 200A. As an example, the control logic circuit 210 may generate control signals to allow the memory device 200A to perform the write operation, the read operation, the store-dirty operation, and the store operation.

The control logic circuit 210 may include a command decoder 211 that decodes a command CMD applied thereto from the memory controller 100A (refer to FIG. 3) and a mode register set 212 that sets an operation mode of the memory device 200A (refer to FIG. 3).

The command decoder 211 may decode the command CMD, such as the active command ACT, the precharge command PRE, the write command WR, etc., and may generate internal command signals, such as an internal active signal IACT, an internal precharge signal IPRE, an internal write signal IWR, etc.

In addition, the command decoder 211 may decodes the command CMD, such as the store-dirty command STD, the store command ST, etc., and may generate internal command signals, such as an internal store-dirty signal ISTD, an internal store signal IST, etc.

The store management circuit 600 may control an operation of storing the metadata stored in the bank register group 500 into the metadata region MR.

The store management circuit 600 may receive the internal store-dirty signal ISTD. The store management circuit 600 may control the column decoder group 270 and the bank register group 500 to perform the store-dirty operation in response to the internal store-dirty signal ISTD. As an example, the store management circuit 600 may control the column decoder 270 and the bank register group 500 with reference to the dirty bitmap to store only the dirty metadata of the data of the bank register group 500 in the metadata region MR.

The store management circuit 600 may receive the internal store signal IST. Responsive to the internal store signal IST, the store management circuit 600 may control the column decoder group 270 and the bank register group 500 to perform the store operation. As an example, the store management circuit 600 may control the column decoder group 270 with reference to the dirty bitmap to store the dirty metadata of the bank register group 500 and the metadata excluding the dirty metadata of the bank register group 500 in the metadata region MR.

Figure 8:
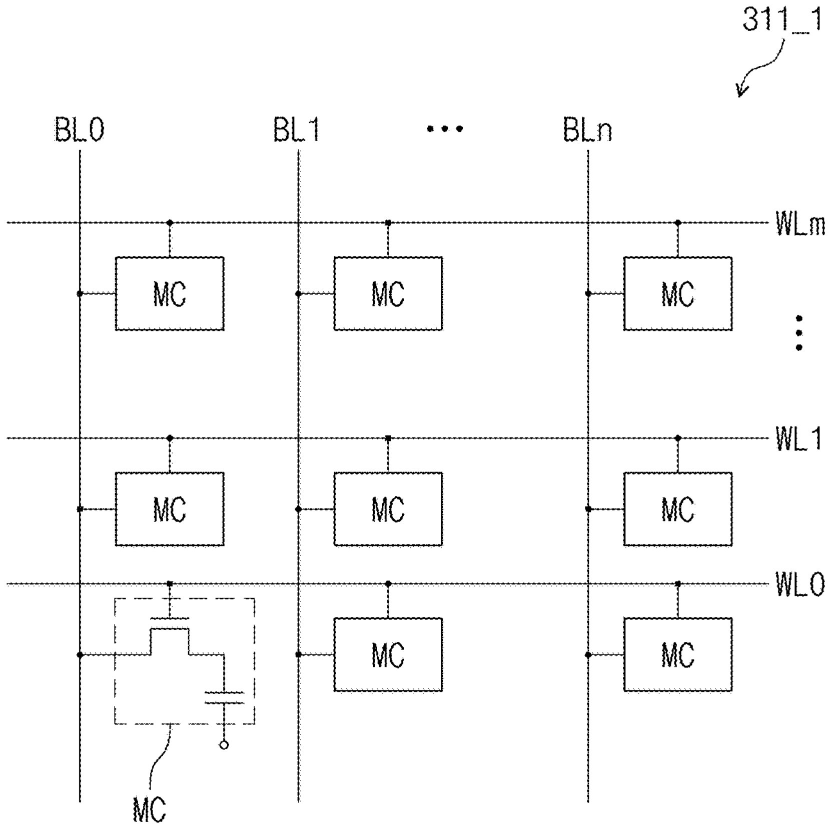
FIG. 8 is a view illustrating memory cells included in a memory bank array according to one or more embodiments of the present disclosure.

FIG. 8 is a view illustrating the memory cells included in the memory bank array according to one or more embodiments of the present disclosure.

Referring to FIG. 8, the first memory bank array 311_1 may include a plurality of word lines WL0 to WLm, a plurality of bit lines BL0 to BLn, and a plurality of memory cells MCs located at points where the word lines WL0 to WLm intersect the bit lines BL0 to BLn.

Each memory cell MC may be a DRAM cell. As an example, each of the memory cells MCs may include a cell transistor connected to the word line and the bit line and a cell capacitor connected to the cell transistor.

Figure 9:
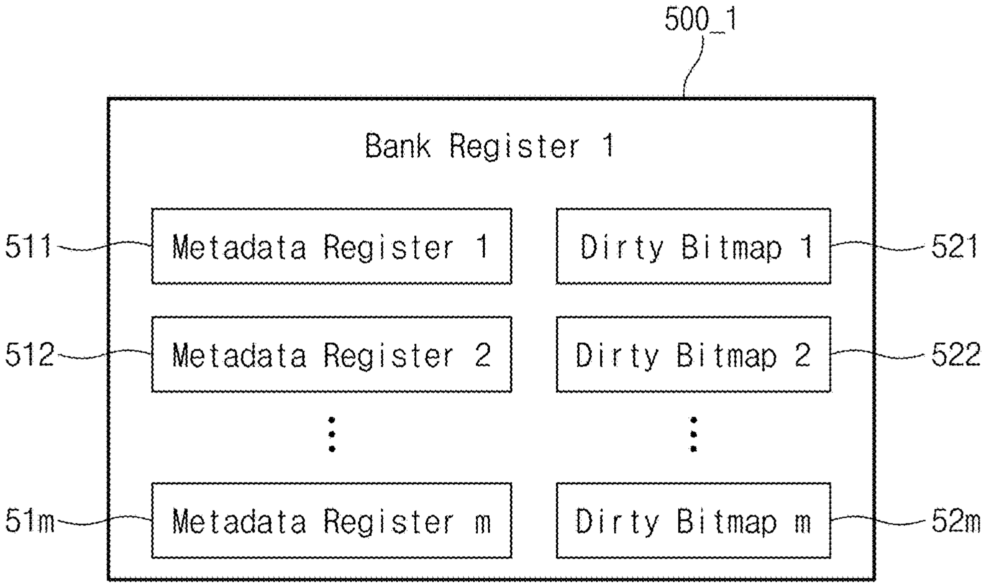
FIG. 9 is a view illustrating a bank register according to one or more embodiments of the present disclosure.

FIG. 9 is a view illustrating the bank register according to one or more embodiments of the present disclosure. The bank register 500_1 of FIG. 9 may correspond to, for example, the first bank register 500_1 of FIG. 3.

Referring to FIG. 9, the first bank register 500_1 may cache the metadata to be stored in the metadata region MR of the first memory bank 310_1 (refer to FIG. 3) or may cache the metadata loaded from the metadata region MR of the first memory bank 310_1.

The first bank register 500_1 may include a plurality of metadata registers 511 to 51*m* and a plurality of dirty bitmaps 521 to 52*m*.

Each of the metadata registers 511 to 51*m* may correspond to a predetermined location in the metadata region MR. As an example, each of the metadata registers 511 to 51*m* may correspond to the memory cells selected by one row and one column in the metadata region MR and may cache the metadata to be stored in the memory cells.

The dirty bitmaps 521 to 52*m* may correspond to the metadata registers 511 to 51*m*. As an example, a first dirty bitmap 521 may correspond to a first metadata register 511, and a second dirty bitmap 522 may correspond to a second metadata register 512.

Each of the dirty bitmaps 521 to 52*m* may manage a state of the metadata stored in the corresponding metadata register. As an example, when some metadata of the metadata stored in the first metadata register 511 are the dirty metadata, the first dirty bitmap 521 may set a bit value of a dirty bit corresponding to the dirty metadata as '1'. As an example, when the store-dirty operation is performed, only dirty metadata marked as dirty by the first dirty bitmap 521 among the metadata of the first metadata register 511 may be stored in the metadata region MR.

Figure 10:
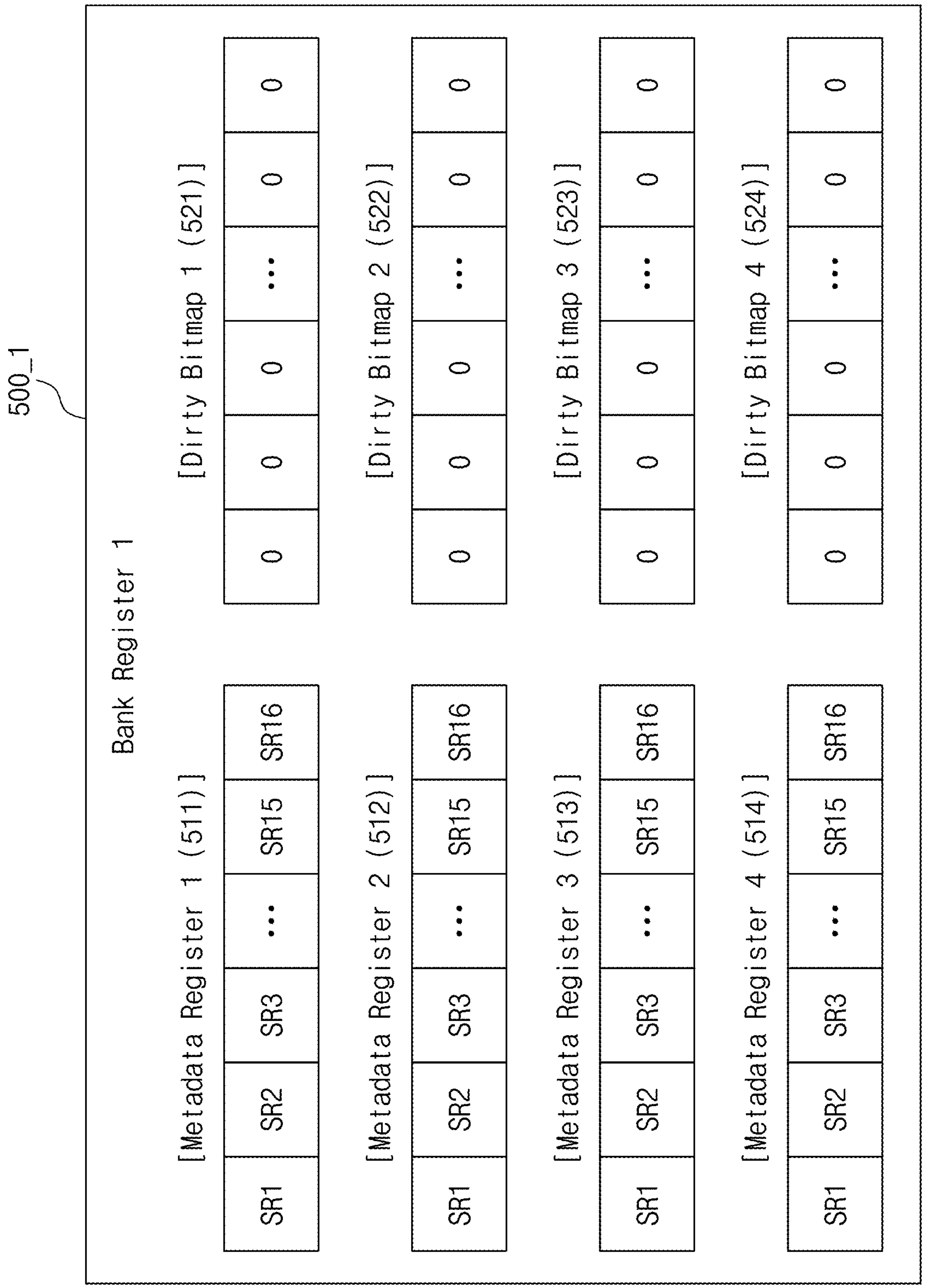
FIGS. 10 and 11A to 11C are views illustrating a first bank register of FIG. 9.
Figure 11A:
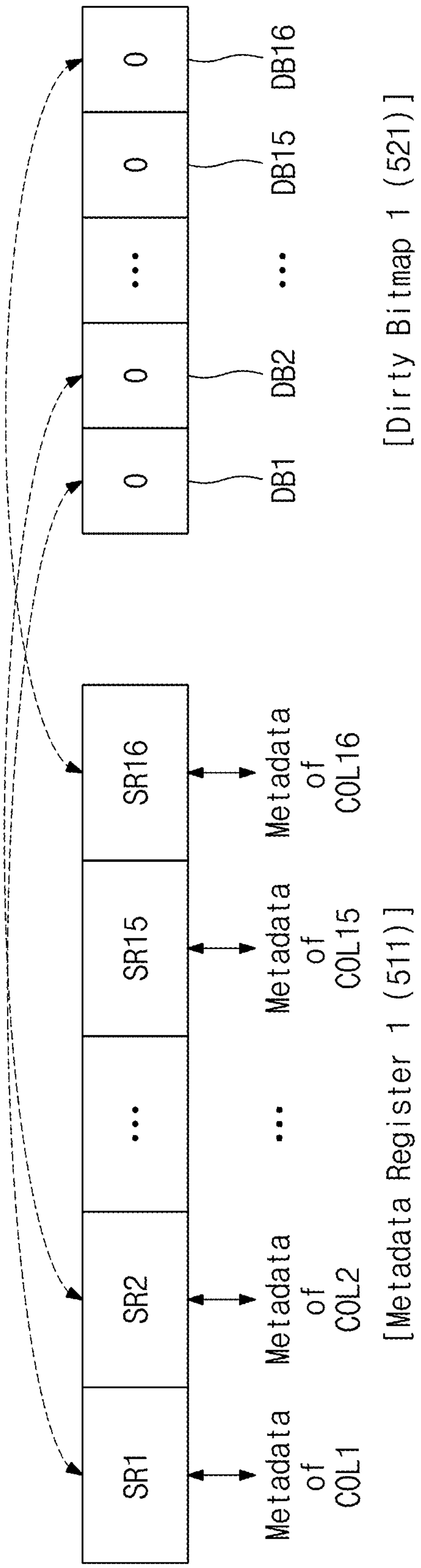
Figure 11B:
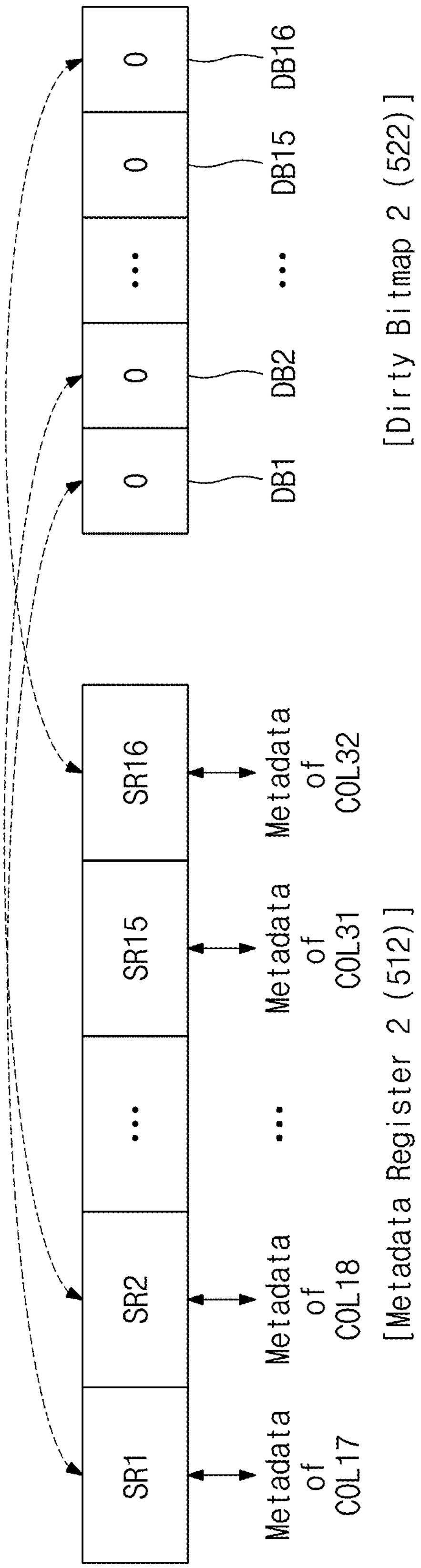
Figure 11C:
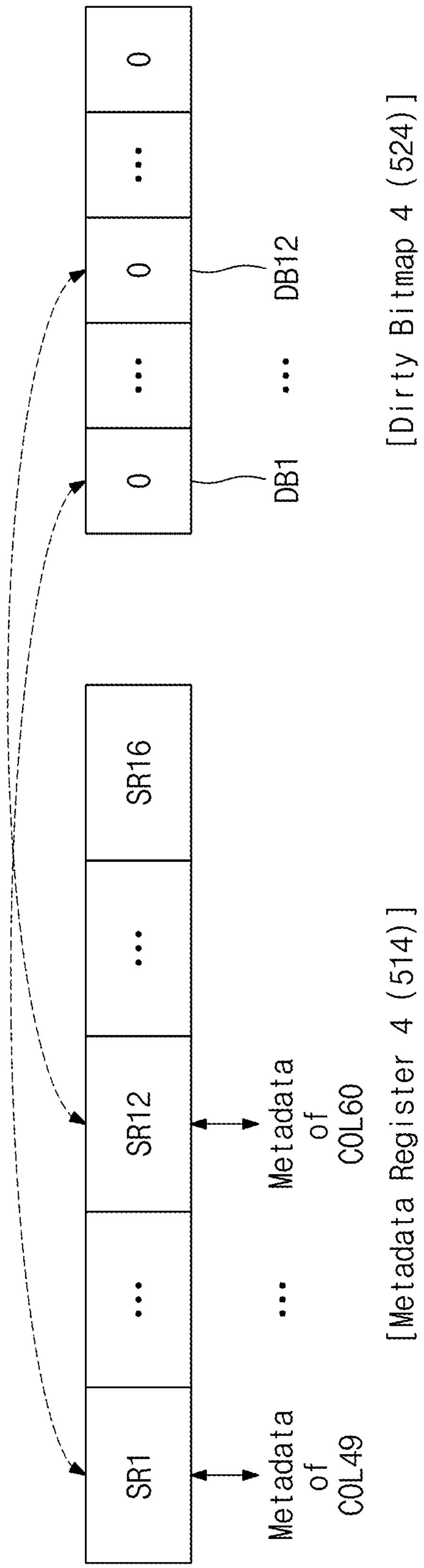

FIGS. 10 and 11A to 11C are views illustrating in detail the first bank register 500_1 of FIG. 9. FIG. 10 shows an example of the first bank register 500_1 in FIG. 9 in more detail. FIGS. 11A to 11C show each metadata register and the dirty bitmap corresponding to the metadata register in more detail.

For the convenience of explanation, similar to FIGS. 5 and 6, it is assumed that the first memory bank 310_1 may include the first to sixty-fourth columns COL1 to COL64, the memory cells corresponding to the first to sixtieth columns COL1 to COL60 are allocated to the main data region MDR, and the memory cells corresponding to the sixty-first to sixty-fourth columns COL61 to COL64 are allocated to the first to fourth metadata regions MR1 to MR4. In addition, it is assumed that 32 bytes of data are stored in the memory cells selected by one row and one column and 2 bytes of metadata correspond to 32 bytes of user data.

Referring to FIGS. 10 and 11A to 11C, the first bank register 500_1 may include first to fourth metadata registers 511 to 514 and first to fourth dirty bitmaps 521 to 524.

The first to fourth metadata registers 511 to 514 may correspond to the first to fourth metadata regions MR1 to MR4, respectively. Each of the first to fourth metadata registers 511 to 514 may include first to sixteenth sub-registers SR1 to SR16. Each of the first to sixteenth sub-registers SR1 to SR16 may cache the metadata corresponding to the corresponding user data.

Each of the first to fourth dirty bitmaps 521 to 524 may display the state of the metadata stored in a corresponding sub-register. As an example, when the metadata stored in the sub-register is the dirty metadata, the dirty bit of the dirty bitmap corresponding to the dirty metadata may be set as '1'.

In more detail, the first metadata register 511 may include the first to sixteenth sub-registers SR1 to SR16 as shown in FIG. 11A. The metadata corresponding to the user data to be stored in the first column COL1 may be stored in the first sub-register SR1. Similarly, the metadata corresponding to the user data to be stored in the second to sixteenth columns COL2 to COL16 may be stored in the second to sixteenth sub-registers SR2 to SR16, respectively.

The first dirty bitmap 521 may include first to sixteenth dirty bits DB1 to DB16. The first to sixteenth dirty bits DB1 to DB16 may display the state of the metadata stored in the first to sixteenth sub-registers SR1 to SR16, respectively.

As an example, in a case where there is a request to change the metadata with respect to the user data stored in the first column COL1 by the request of the memory controller 100A, the metadata requested to be changed or the metadata that has been changed as per the request may be cached in the first sub-register SR1. In this case, the metadata stored in the first sub-register SR1 may be treated as the dirty metadata, and the first dirty bit DB1 of the first dirty bitmap 521 may be changed from '0' to '1'.

As described above, the state of the metadata stored in the first metadata register 511 may be displayed and managed using the first dirty bitmap 521.

In addition, the second to fourth metadata registers 512 to 514 and the second to fourth dirty bitmaps 522 to 524 may be implemented similar to the first metadata register 511 and the first dirty bitmap 521.

As an example, as shown in FIG. 11B, the second metadata register 512 may include the first to sixteenth sub-registers SR1 to SR16, and the metadata corresponding to the user data to be stored in the seventeenth to thirty-second columns COL17 to COL32 may be stored in the first to sixteenth sub-registers SR1 to SR16, respectively. The second dirty bitmap 522 may include the first to sixteenth dirty bits DB1 to DB16, and the first to sixteenth dirty bits DB1 to DB16 may display the state of the metadata cached in the first to sixteenth sub-registers SR1 to SR16, respectively.

In addition, as shown in FIG. 11C, the fourth metadata register 514 may include the first to sixteenth sub-registers SR1 to SR16, and the metadata corresponding to the user data to be stored in the forty-ninth to sixtieth columns COL49 to COL60 may be cached in the first to twelfth sub-registers SR1 to SR12. The fourth dirty bitmap 524 may include the first to twelfth dirty bits DB1 to DB12, and the first to twelfth dirty bits DB1 to DB12 may display the state of the metadata cached in the first to twelfth sub-registers SR1 to SR12, respectively. In this case, the fourth metadata register 514 may include the thirteenth to sixteenth sub-registers SR13 to SR16 that are not used, and the thirteenth to sixteenth sub-registers SR13 to SR16 may be provided as spare registers. As an example, the thirteenth to sixteenth sub-registers SR13 to SR16 may correspond to the thirteenth part to the sixteenth part where the metadata is not stored among the memory cells corresponding to the sixty-fourth column COL64 (refer to FIGS. 5 and 6).

In FIGS. 11A-11C, although the dirty bitmaps 1-3 include only zeroes (0) as bit values, these are merely examples, and different bit values may be used to represent the state of the metadata. For instance, a bit value of 0 may be used to denote clean metadata, while a bit value of 1 may be used to represent dirty metadata.

Figure 12:
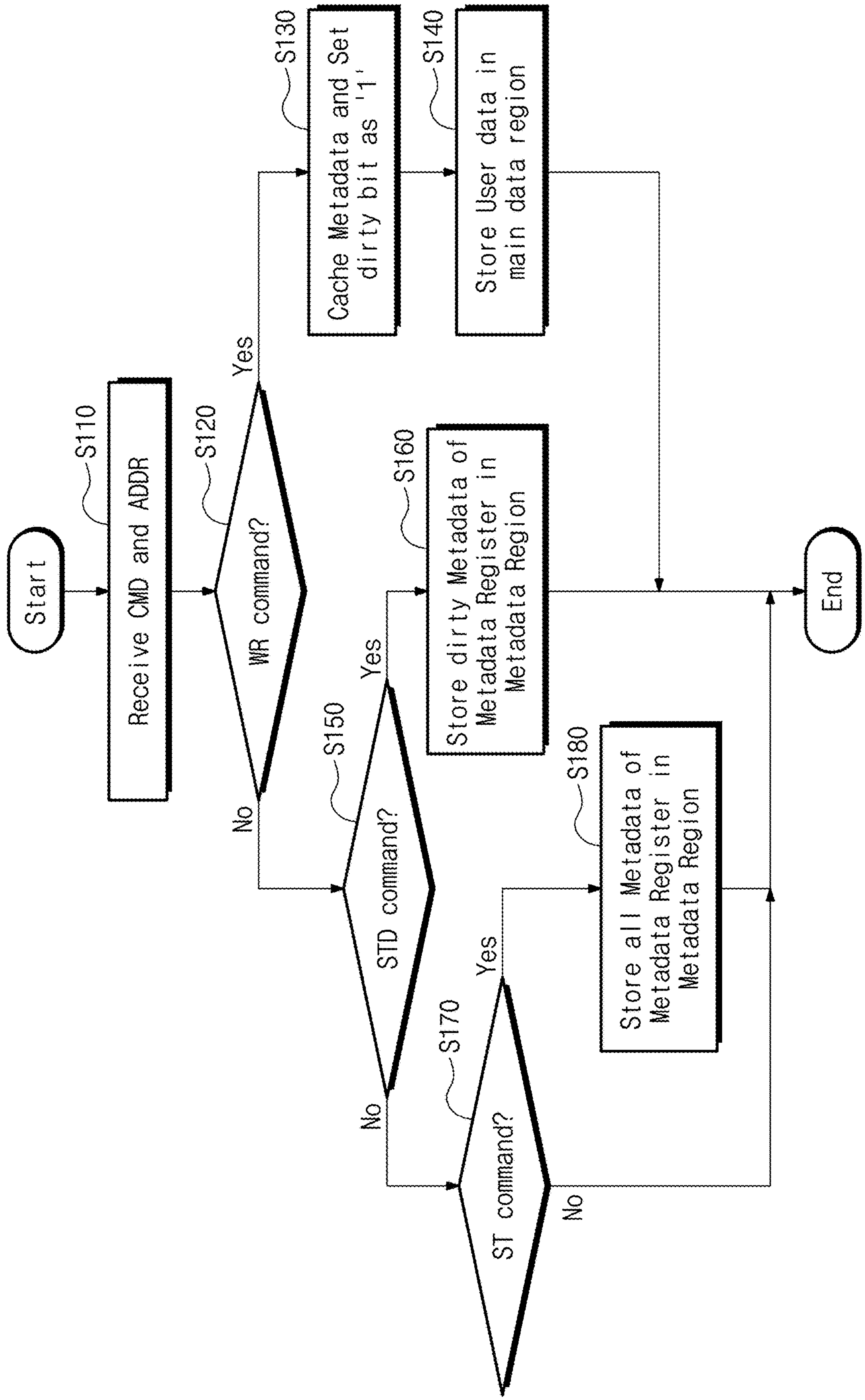
FIG. 12 is a flowchart illustrating a write operation in a metadata mode according to one or more embodiments of the present disclosure.

FIG. 12 is a flowchart illustrating the write operation in the metadata mode according to one or more embodiments of the present disclosure.

In operation S110, the memory device 200A (refer to FIG. 3) may receive the command CMD and the address ADDR corresponding to the command CMD from the memory controller 100A (refer to FIG. 3).

In operation S120, the memory device 200A may determine whether the received command CMD is the write command WR.

When it is determined that the received command CMD is the write command WR, an operation S130 may be performed. In the operation S130, the memory device 200A may cache the metadata in the sub-register of the corresponding metadata register and may set the dirty bit of the dirty bitmap corresponding to the sub-register as '1'. Then, In operation S140, the memory device 200A may store the user data in the main data region MDR.

Meanwhile, when it is determined that the received command CMD is not the write command WR, an operation S150 may be performed.

In the operation S150, the memory device 200A may determine whether the received command CMD is the store-dirty command STD.

When it is determined that the received command CMD is the store-dirty command STD, an operation S160 may be performed. In the operation S160, the memory device 200A may store only the dirty metadata in the metadata region MR among the metadata cached in the metadata register. Meanwhile, when it is determined that the received command CMD is not the store-dirty command STD, an operation S170 may be performed.

In the operation S170, the memory device 200A may determine whether the received command CMD is the store command ST.

When it is determined that the received command CMD is the store command ST, an operation S180 may be performed. In the operation S180, the memory device 200A may store all the metadata stored in the metadata register in the metadata region MR.

Meanwhile, when it is determined that the received command CMD is not the store command ST, the store operation and the store-dirty operation may be omitted. In this case, the memory device 200A may receive the precharge command, and thus, the write operation in the metadata mode may be finished.

Meanwhile, the above descriptions are merely an example, and the present disclosure should not be limited thereto or thereby. The order of the operation S120 to determine whether the received command is the write command WR, the operation S150 to determine whether the received command is the store-dirty command STD, and the operation S170 to determine whether the received command is the store command ST may be changed, or the operations S120, S150, and S170 may be omitted depending on the embodiments.

In addition, according to embodiments, the operation of receiving and processing the write command WR, the operation of receiving and processing the store-dirty command STD, and the operation of receiving and processing the store command ST may be independently performed.

Hereinafter, the operation of receiving and processing the write command WR, the operation of receiving and processing the store-dirty command STD, and the operation of receiving and processing the store command ST will be described in more detail.

Figure 13:
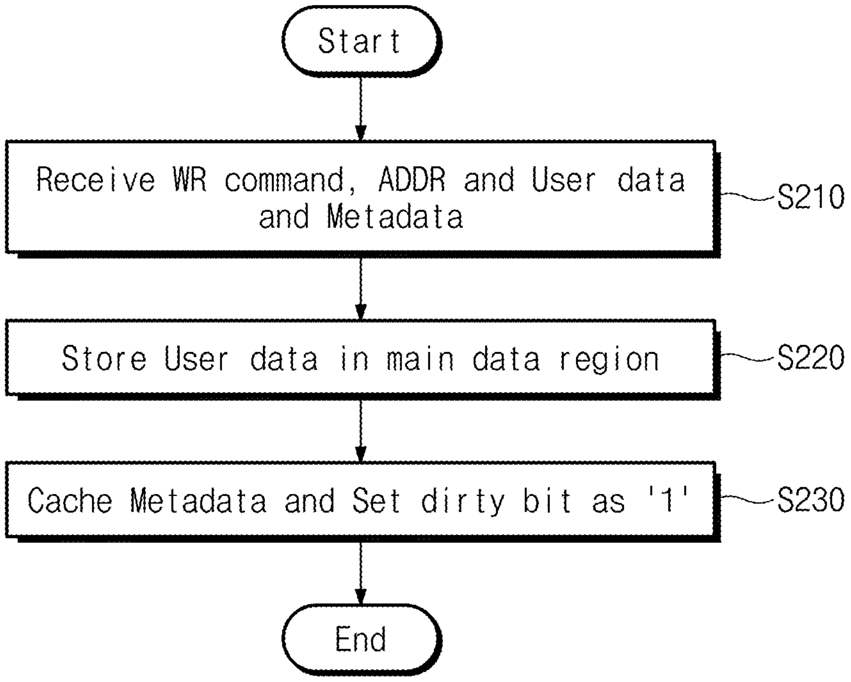
FIG. 13 is a flowchart illustrating an operation of a memory device upon receiving a write command according to one or more embodiments of the present disclosure.
Figure 14:
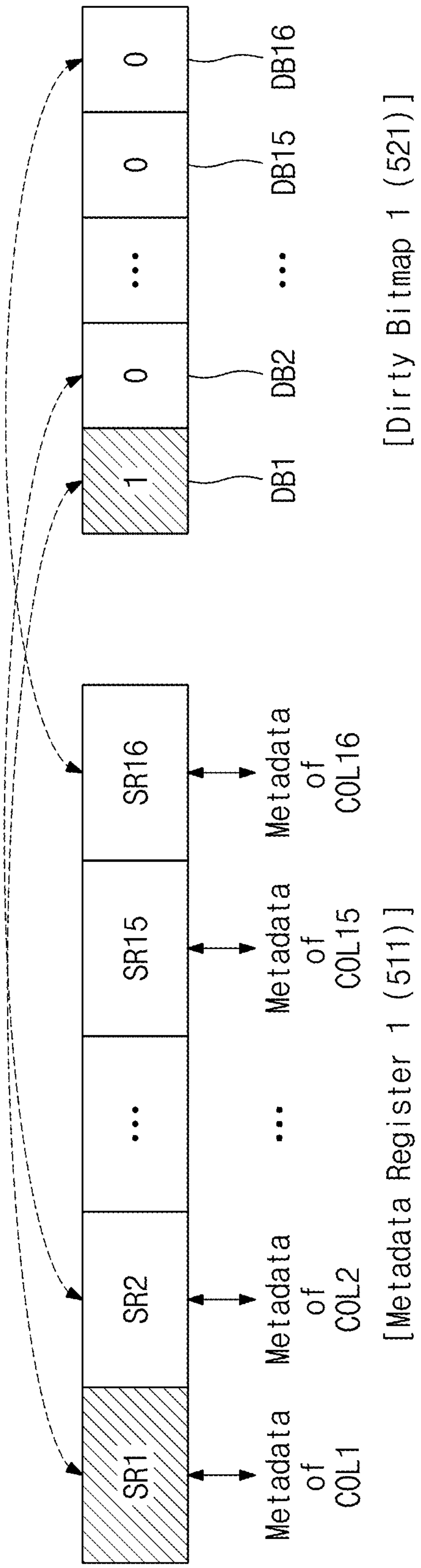
FIGS. 14 and 15 are views illustrating an example of processing metadata and user data according to one or more embodiments of the present disclosure.
Figure 15:
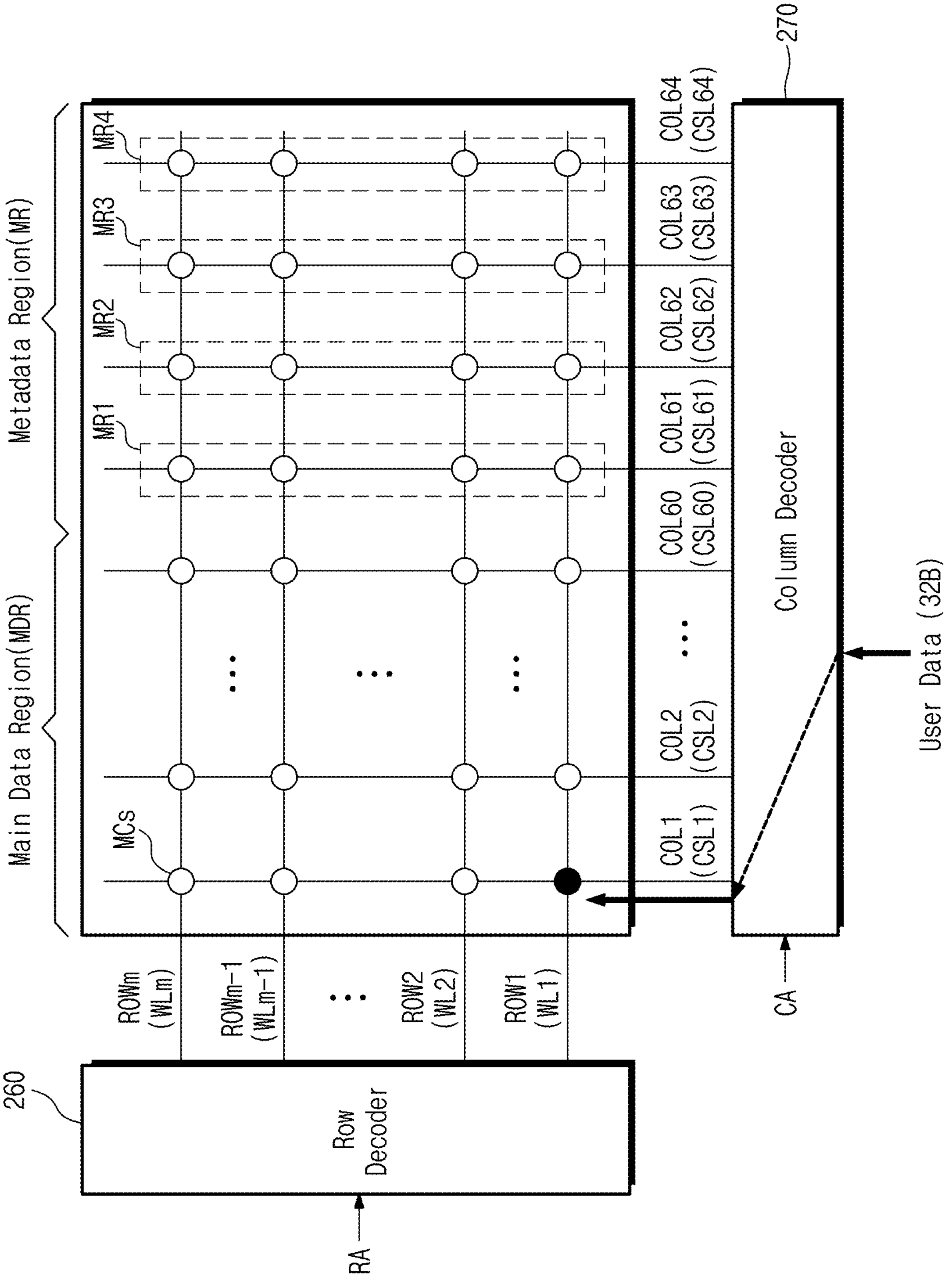

FIGS. 13 to 15 are views illustrating an operation of the memory device when receiving the write command WR. In detail, FIG. 13 is a flowchart illustrating the operation of the memory device when receiving the write command WR, and FIGS. 14 and 15 are views illustrating an example of processing the metadata and the user data.

For the convenience of explanation, it is assumed that the first metadata register 511 includes sixteen sub-registers SR1 to SR16 similar to FIGS. 10 and 11. In addition, it is assumed that the user data is stored in the memory cells corresponding to the first column COL1 and the first row ROW1.

Referring to FIG. 13, the memory device 200A may receive the write command WR, the address ADDR, the user data, and the metadata in an operation S210. In this case, the received address ADDR may include the memory bank address memory bank_ADDR, the row address ROW_ADDR, and the column address COL_ADDR of the memory cells in which the user data is stored.

In operation S220, the memory device 200A may store the user data in the main data region MDR.

As an example, the memory device 200A may store 32 bytes of user data in the memory cells corresponding to the first column COL and the first row ROW1 of the main data region MDR as shown in FIG. 15.

In operation S230, the memory device 200A may cache the received metadata in the sub-register of the corresponding register and may set the dirty bit of the dirty bitmap corresponding to the sub-register as '1'.

As an example, referring to FIG. 14, the first sub-register SR1 of the first metadata register 511 may correspond to the metadata with respect to the user data to be stored in the first column COL1. Accordingly, the memory device 200A may cache the received metadata in the first sub-register SR1 of the first metadata register 511. Then, the memory device 200A may change the first dirty bit DB1 of the first dirty bitmap 521 corresponding to the first sub-register SR1 to '1' from '0'.

Meanwhile, for the convenience of explanation, it is assumed that the operation S220 that stores the user data in the main data region MDR is performed earlier than the operation S230 in the descriptions with reference to FIG. 13, however, the present disclosure should not be limited thereto or thereby. As an example, the operation S220 that stores the user data in the main data region MDR may be performed later than the operation S230 or may be performed in parallel with the operation S230.

Figure 16:
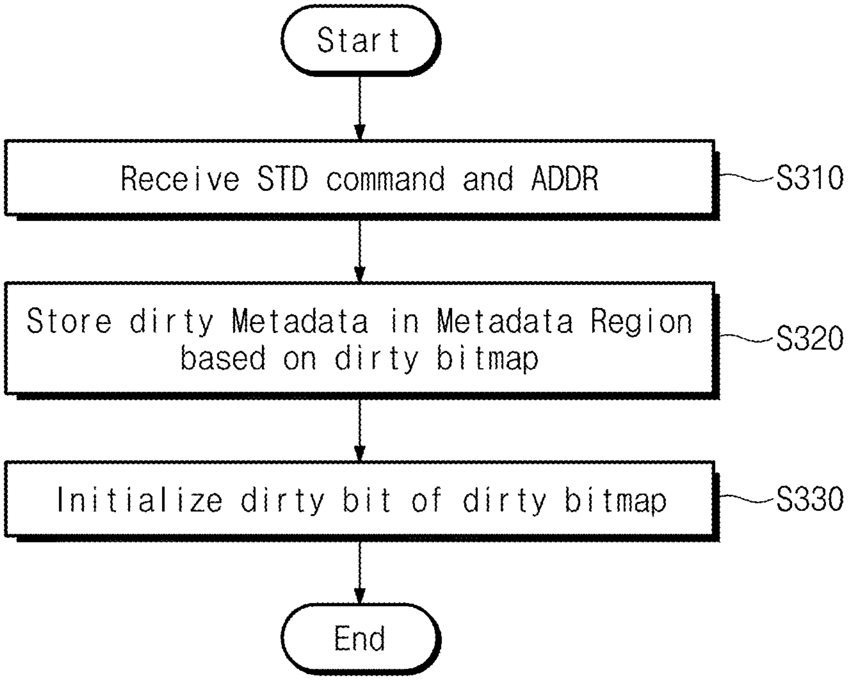
FIG. 16 is a flowchart illustrating an operation of a memory device upon receiving a store-dirty command according to one or more embodiments of the present disclosure.
Figure 17:
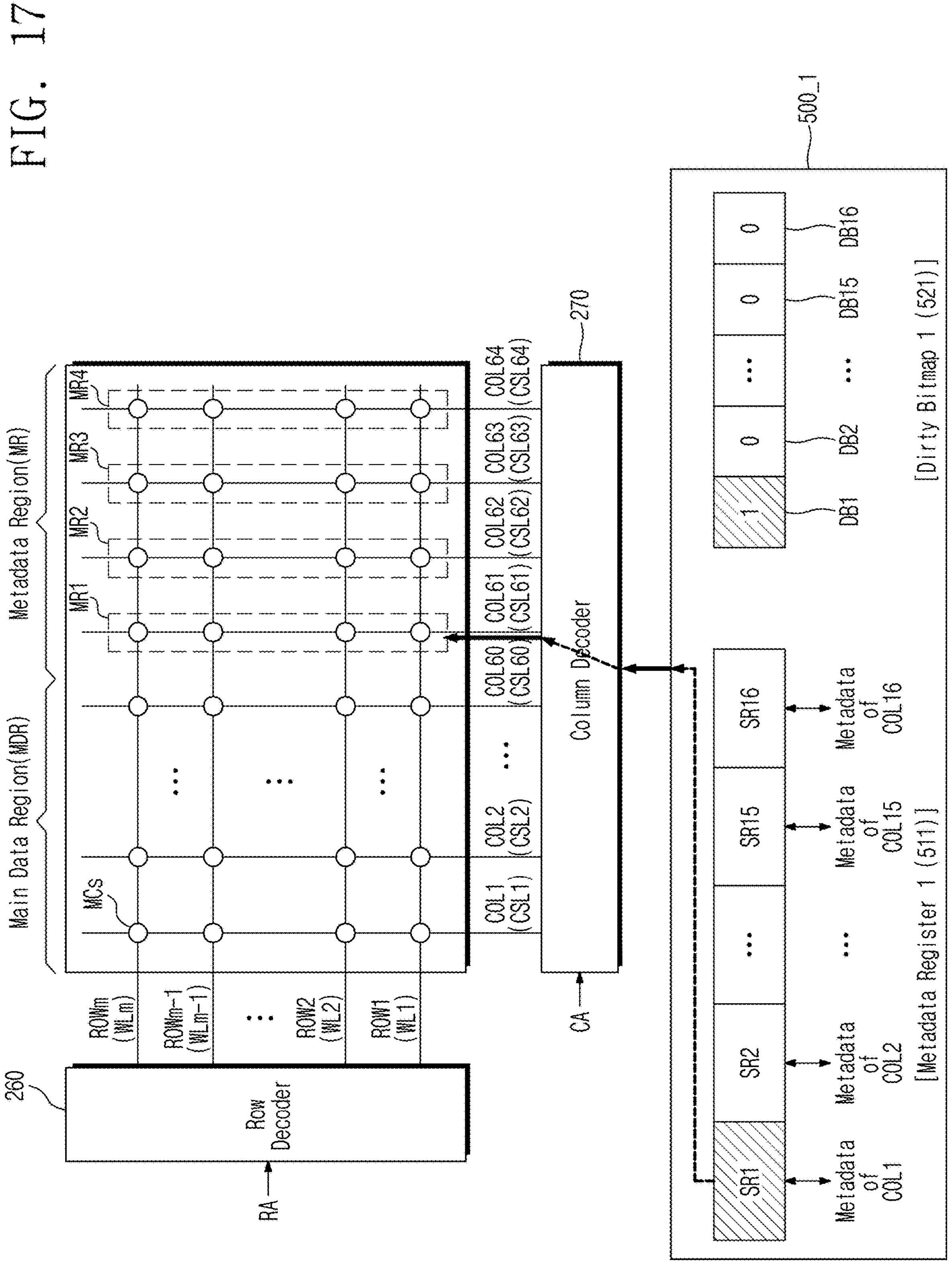
FIGS. 17 to 19 are views illustrating an example of processing metadata and dirty bits upon receiving a store-dirty command according to one or more embodiments of the present disclosure.
Figure 18:
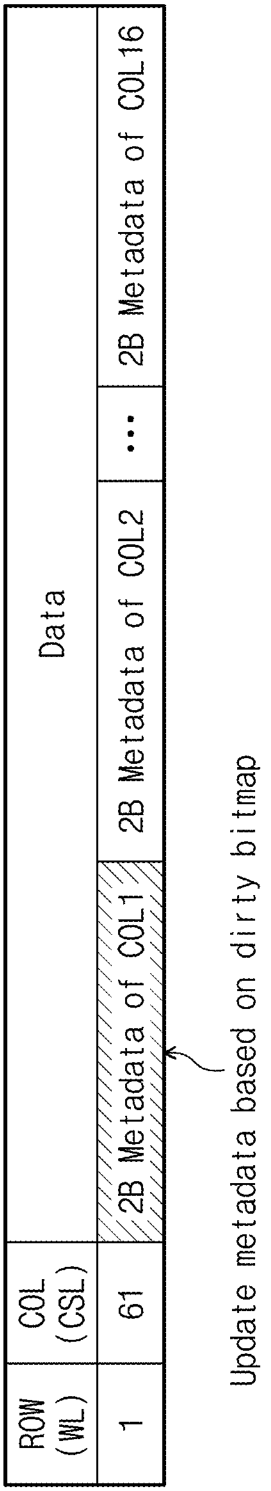
Figure 19:
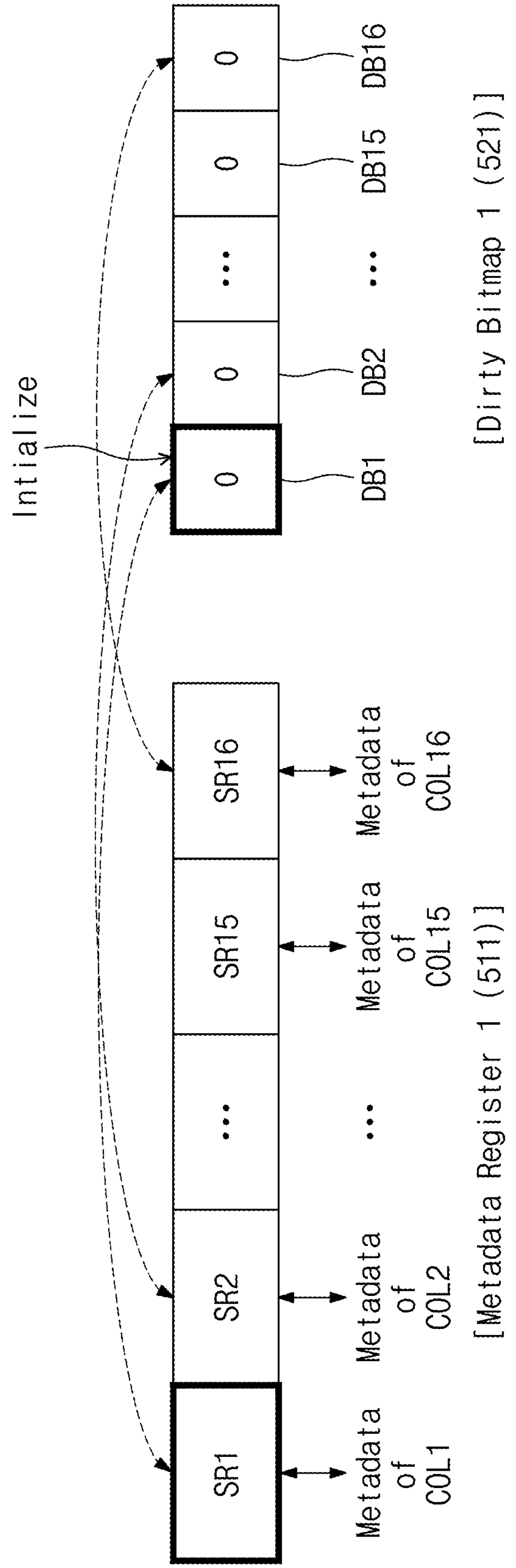

FIGS. 16 to 19 are views illustrating an operation of the memory device when receiving the store-dirty command STD. In detail, FIG. 16 is a flowchart illustrating the operation of the memory device when receiving the store-dirty command STD, and FIGS. 17 to 19 are views illustrating an example of processing the metadata and the dirty bits when receiving the store-dirty command STD.

For the convenience of explanation, similar to FIGS. 13 to 15, it is assumed that the data stored in the first sub-register SR1 of the first metadata register 511 is the dirty metadata.

Referring to FIG. 16, the memory device 200A may receive the store-dirty command STD and the address ADDR In operation S310.

As an example, the received address ADDR may be the address ADDR of the user data and may include the memory bank address memory bank_ADDR, the row address ROW_ADDR, and the column address COL_ADDR of the user data. Responsive to the received store-dirty command STD, the memory device 200A may store the dirty metadata among the metadata of the metadata register corresponding to the address ADDR of the user data in the memory cell of the metadata region MR corresponding to the address ADDR of the user data based on the address ADDR of the received user data.

As an example, the received address ADDR may be the address ADDR of the metadata and may include the memory bank address memory bank_ADDR, the row address ROW-_ADDR, and the column address COL_ADDR of the metadata. Responsive to the received store-dirty command STD, the memory device 200A may store the dirty metadata among the metadata of the metadata register corresponding to the address ADDR of the metadata in the memory cell of the metadata region MR corresponding to the address ADDR of the metadata based on the address ADDR of the received metadata.

As an example, when at least one bit of the dirty bitmap is '1' and the operation of loading the metadata from the metadata region MR has not been previously performed, the memory device 200A may receive the store-dirty command STD.

That is, since the operation of loading the metadata from the metadata region MR has not been previously performed, the corresponding metadata register may include the first sub-register SR1 in which the metadata corresponding to the user data is stored and other sub-registers SR2 to SR16 in which invalid data is stored. Accordingly, when the memory device 200A receives the store-dirty command STD, the memory device 200A may store only the metadata of the first sub-register SR1 in the corresponding memory cells based on a value of the corresponding dirty bitmap, however, this is merely an example, and the present disclosure should not be limited thereto or thereby. For example, the store management circuit 600 of the memory device 200A may store the dirty metadata cached in a sub-register selected from a plurality of sub-registers in the metadata region MR in response to the store-dirty command STD. For example, the store management circuit 600 of the memory device 200A may prevent metadata cached in a sub-register, which is not selected among the plurality of sub-registers, from being stored in the metadata region MR in response to the store-dirty command STD. According to embodiments, even though the operation of loading the metadata is performed, when the store-dirty command STD is received, the memory device 200A may store only metadata of a certain sub-register in the memory cells based on the dirty bitmap.

In operation S320, the memory device 200A may store the dirty metadata in the metadata region MR based on the dirty bitmap.

As an example, as shown in FIG. 17, the first dirty bit DB1 of the first dirty bitmap 521 may be '1'. Accordingly, the memory device 200A may determine that the metadata cached in the first sub-register SR1 of the first metadata register 511 is the dirty metadata. In other words, the memory device 200A may store only the metadata cached in the first sub-register SR1 of the first metadata register 511 in the corresponding memory cells based on that the first dirty bit DB1 of the first dirty bitmap 521 is '1', and the invalid data stored in the other sub-registers SR2 to SR16 of the first metadata register 511 may not be stored in the corresponding memory cells.

Then, the memory device 200A may store the dirty metadata cached in the first sub-register SR1 of the first metadata register 511 in the memory cells corresponding to the first row ROW1 and the sixty-first column COL61. As an example, the dirty metadata cached in the first sub-register SR1 of the first metadata register 511 may be stored in the $1^{st}$ part corresponding to the first sub-register SR1 of the first metadata register 511 among the memory cells corresponding to the first row ROW1 and the sixty-first column COL61.

Accordingly, as shown in FIG. 18, the metadata with respect to the user data of the first row ROW1 and the first column COL1 may be updated. As an example, the metadata with respect to the user data of the first row ROW1 and the first column COL1 may be updated in the memory cells of the $1^{st}$ part corresponding to the first sub-register SR1 of the first metadata register 511 among the memory cells corresponding to the first row ROW1 and the sixty-first column COL61.

Meanwhile, other metadata stored together in the first row ROW1 and the sixty-first column COL61 may not be changed. That is, other metadata stored together in the memory cells of the other parts (e.g., the $2^{nd}$ to $16^{th}$ parts) that do not correspond to the first sub-register SR1 of the first metadata register 511 among the memory cells corresponding to the first row ROW1 and the sixty-first column COL61 may not be changed.

The memory device 200A may initialize the dirty bit of the dirty bitmap In operation S330.

As an example, as shown in FIG. 19, the memory device 200A may change the first dirty bit DB1 of the first dirty bitmap 521 to '0' from '1'.

Figure 20:
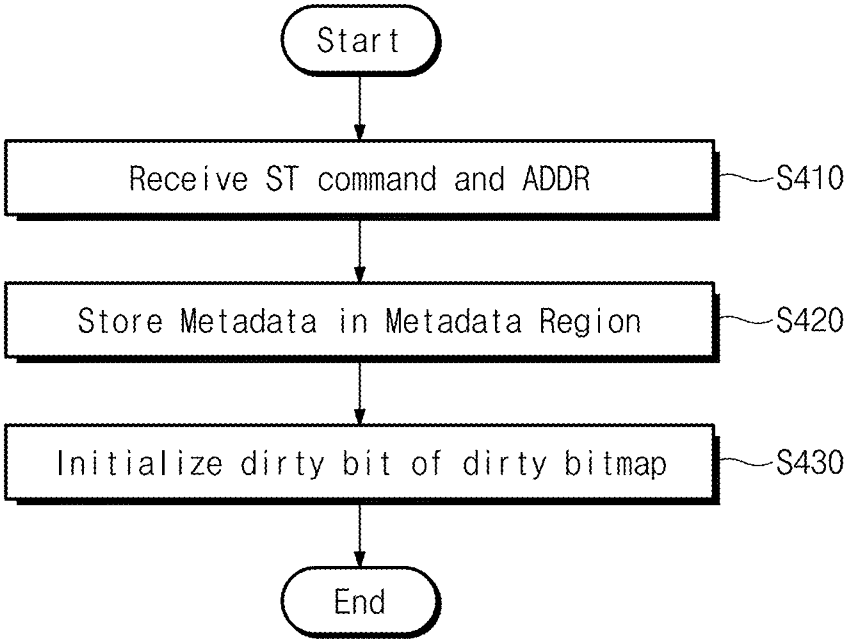
FIG. 20 is a flowchart illustrating an operation of a memory device upon receiving a store command according to one or more embodiments of the present disclosure.
Figure 21:
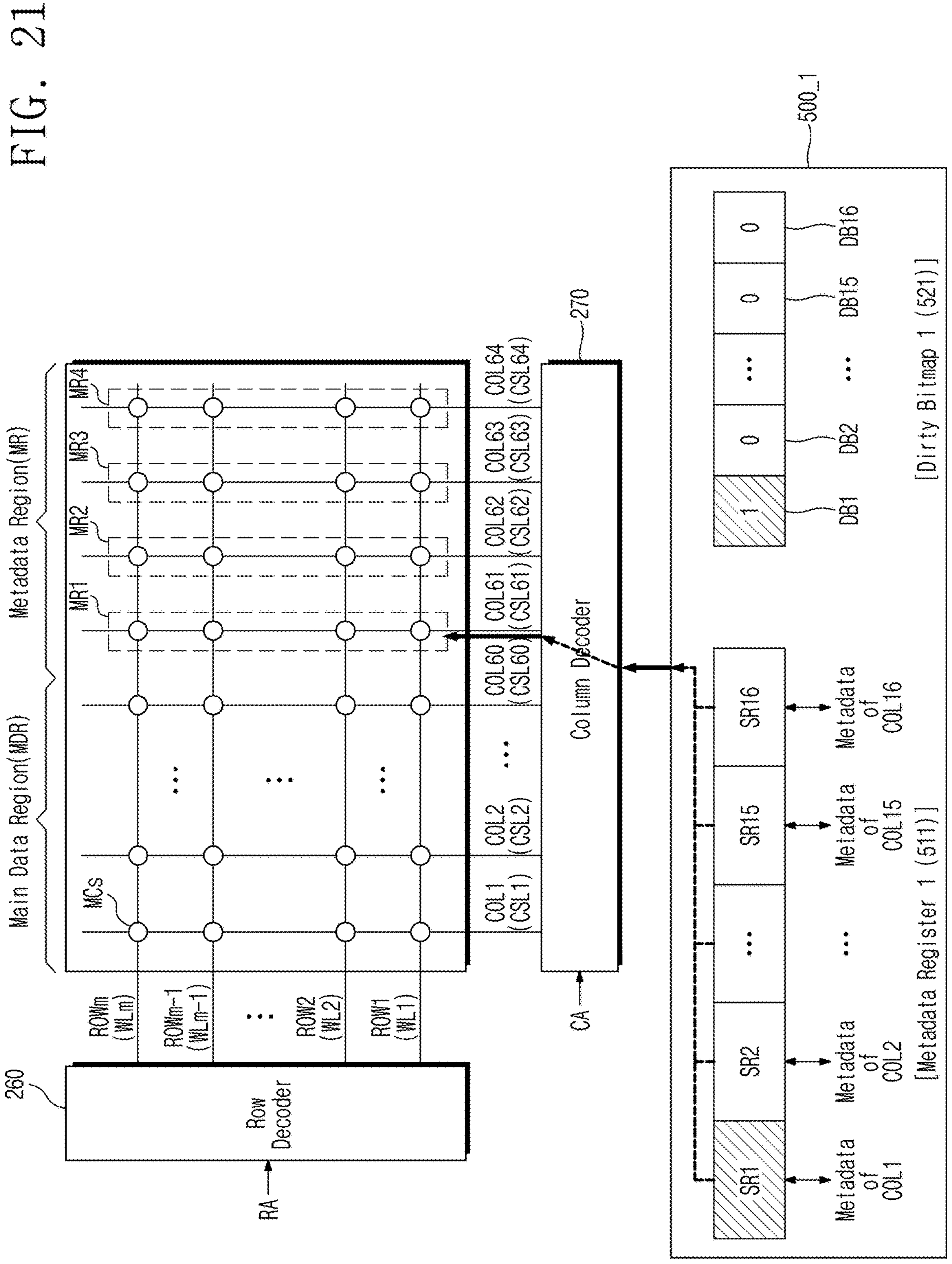
FIGS. 21 to 23 are views illustrating an example of processing metadata and dirty bits upon receiving a store command according to one or more embodiments of the present disclosure.
Figure 22:
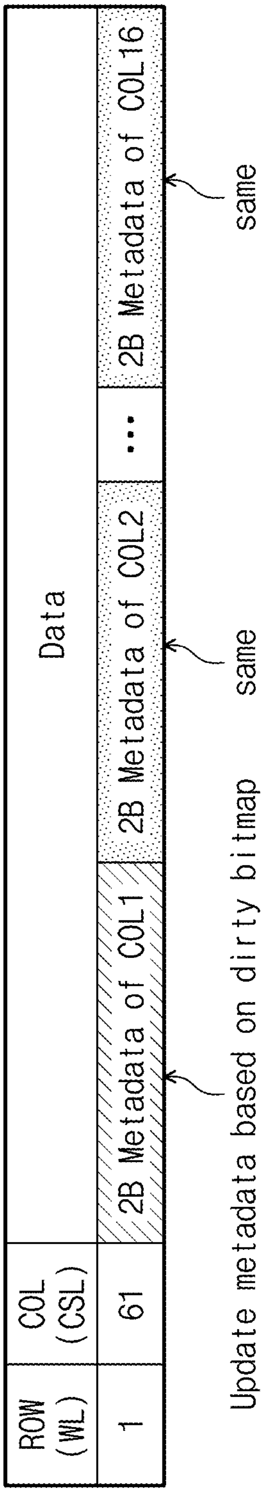
Figure 23:
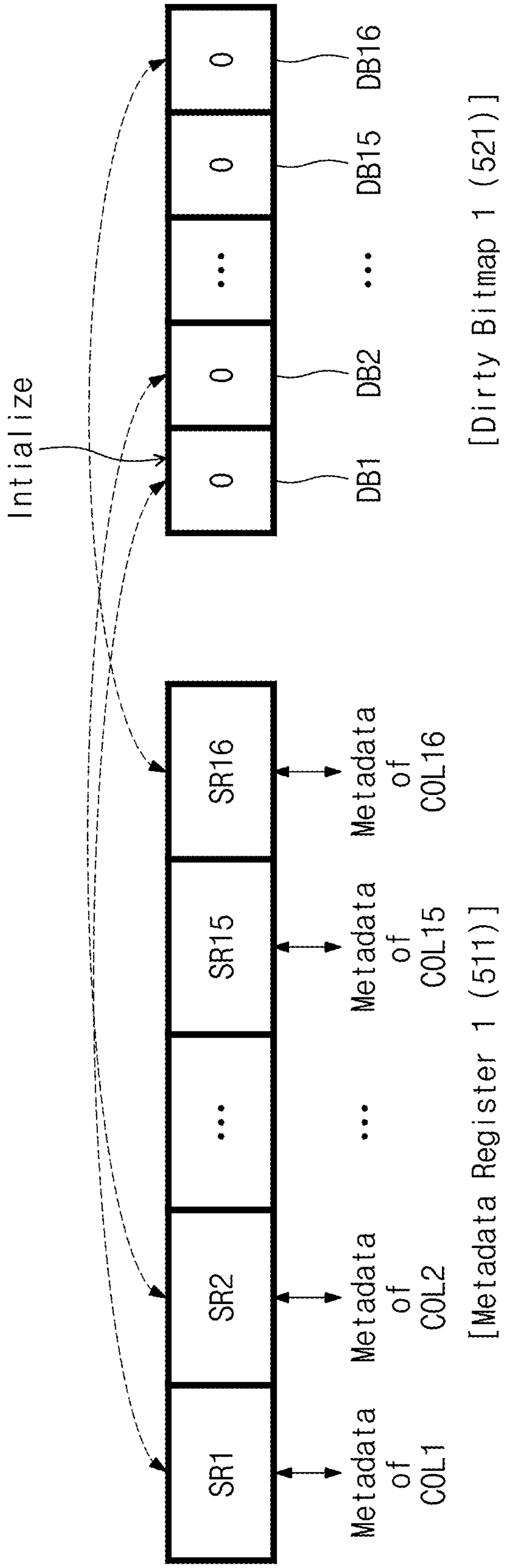

FIGS. 20 to 23 are views illustrating an operation of the memory device when receiving the store command ST. In detail, FIG. 20 is a flowchart illustrating the operation of the memory device when receiving the store command ST, and FIGS. 21 to 23 are views illustrating an example of processing the metadata and the dirty bits when receiving the store command ST.

For the convenience of explanation, similar to FIGS. 13 to 15, it is assumed that the data stored in the first sub-register SR1 of the first metadata register 511 is the dirty metadata.

Referring to FIG. 20, the memory device 200A may receive the store command ST and the address ADDR In operation S410.

As an example, when at least one bit of the dirty bitmap is '1' and the operation of loading the metadata from the metadata region MR has previously been performed, the memory device 200A may receive the store command ST.

As an example, the received address ADDR may be the address ADDR of the user data and may include the memory bank address memory bank_ADDR, the row address ROW_ADDR, and the column address COL_ADDR of the user data. Responsive to the received store command ST, the memory device 200A may store the metadata of the metadata register corresponding to the address ADDR of the user data in the memory cell of the metadata region MR corresponding to the address ADDR of the user data based on the address ADDR of the received user data.

As an example, the received address ADDR may be the address ADDR of the metadata and may include the memory bank address memory bank_ADDR, the row address ROW_ADDR, and the column address COL_ADDR of the metadata. Responsive to the received store command ST, the memory device 200A may store the metadata of the metadata register corresponding to the address ADDR of the metadata in the memory cell of the metadata region MR corresponding to the address ADDR of the metadata based on the address ADDR of the received metadata.

In operation S420, the memory device 200A may store all the metadata cached in the metadata register in the metadata region MR with reference to the dirty bitmap.

As an example, as shown in FIG. 21, the memory device 200A may store all the metadata cached in the first sub-register SR1 of the first metadata register 511 in the memory cells corresponding to the first row ROW1 and the sixty-first column COL61 regardless of the value of the dirty bit of the first dirty bitmap 521. Accordingly, as shown in FIG. 22, the metadata with respect to the user data of the first row ROW1 and the first column COL1 may be updated.

In addition, since the metadata stored in the memory cells of the first row ROW1 and the sixty-first column COL61 has previously been loaded to the first metadata register 511, the metadata with respect to the user data of the first row ROW1 and the second column COL2 to the metadata with respect to the user data of the first row ROW1 and the sixteenth column COL16 may not be substantially changed. That is, even though all the metadata stored in the first sub-register SR1 of the first metadata register 511 are stored in the memory cells corresponding to the first row ROW1 and the sixty-first column COL61, only the dirty metadata may be updated, and other metadata may substantially be the same.

In operation S430, the memory device 200A may initialize the dirty bit of the dirty bitmap.

As an example, as shown in FIG. 23, the memory device 200A may change the bit value of the first dirty bit DB1 of the first dirty bitmap 521 from '1' to '0'.

As described above with reference to FIGS. 3 to 23, the memory device 200A according to the present disclosure may support the write operation in the metadata mode and may separately manage the dirty metadata and the location information where the dirty metadata is to be stored in the metadata region MR. Accordingly, the memory device 200A may effectively perform the operation of storing the dirty metadata cached in the bank register in the metadata region MR in the metadata mode.

Meanwhile, embodiments that effectively perform the write operation in the metadata mode are described with reference to FIGS. 3 to 23, however, this is merely an example, and the present disclosure may be applied to the load operation in the metadata mode. Hereinafter, embodiments that effectively perform the load operation in the metadata mode will be described in detail.

[A Memory Device that Performs a Load Operation in a Metadata Mode]

Figure 24:
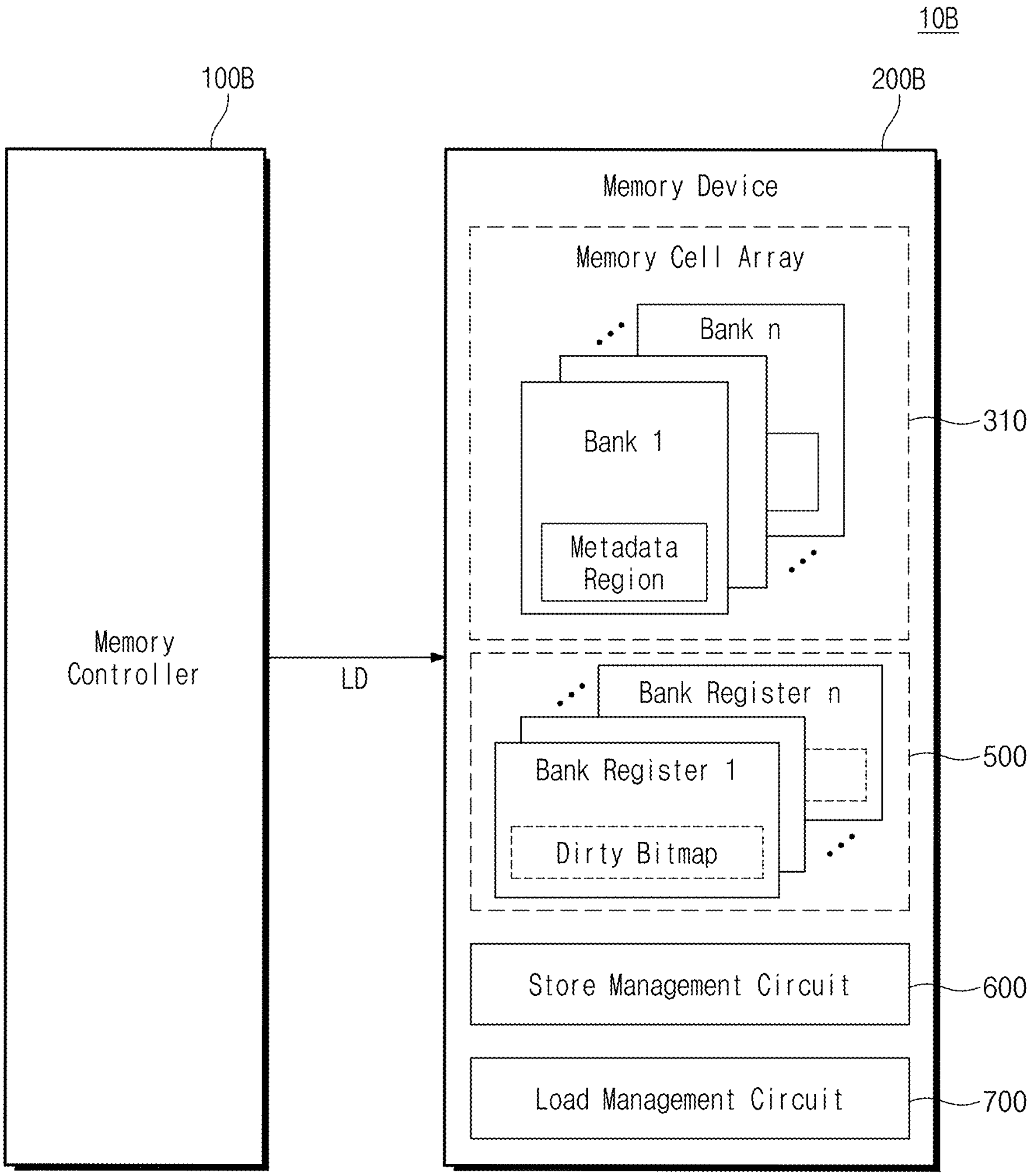
FIG. 24 is a block diagram illustrating a memory system according to one or more embodiments of the present disclosure.

FIG. 24 is a block diagram illustrating a memory system according to one or more embodiments of the present disclosure. The memory system 10B of FIG. 24 is similar to the memory system 10A of FIG. 3. In FIG. 24, the same or similar reference numerals denote the same or similar elements in FIG. 3, and thus, detailed descriptions of the same or similar elements will be omitted.

Referring to FIG. 24, the memory system 10B may include a memory controller 100B and a memory device 200B. The memory device 200B may include a memory cell array 310, a bank register group 500, a store management circuit 600, and a load management circuit 700.

When compared with the memory device 200A of FIG. 3, the memory device 200B of FIG. 24 may further include the load management circuit 700.

The load management circuit 700 may control an operation of loading metadata stored in a metadata region MR of a memory bank to each bank register.

According to one or more embodiments of the present disclosure, during the load operation in the metadata mode, the memory device 200B may receive a load command LD from the memory controller 100B. Responsive to the load command LD, the load management circuit 700 may control the memory device 200B to load the metadata stored in the metadata region MR to a corresponding bank register.

In particular, the load management circuit 700 may control the memory device 200B using a dirty bitmap to load only clean metadata excluding dirty metadata among the metadata stored in the metadata region MR to the bank register. In this case, the clean metadata may refer to metadata that is not requested to be changed among the metadata stored in the metadata region MR.

As described above, since only the clean metadata is selectively loaded from the metadata region MR of the memory bank to the bank register using the dirty bitmap, the dirty metadata cached in the bank register may be protected from being overwritten. In other words, the dirty metadata may not be damaged or corrupted by the data loaded from the memory bank to the bank register during the load operation, thereby enhancing the efficiency of the load operation.

Figure 25:
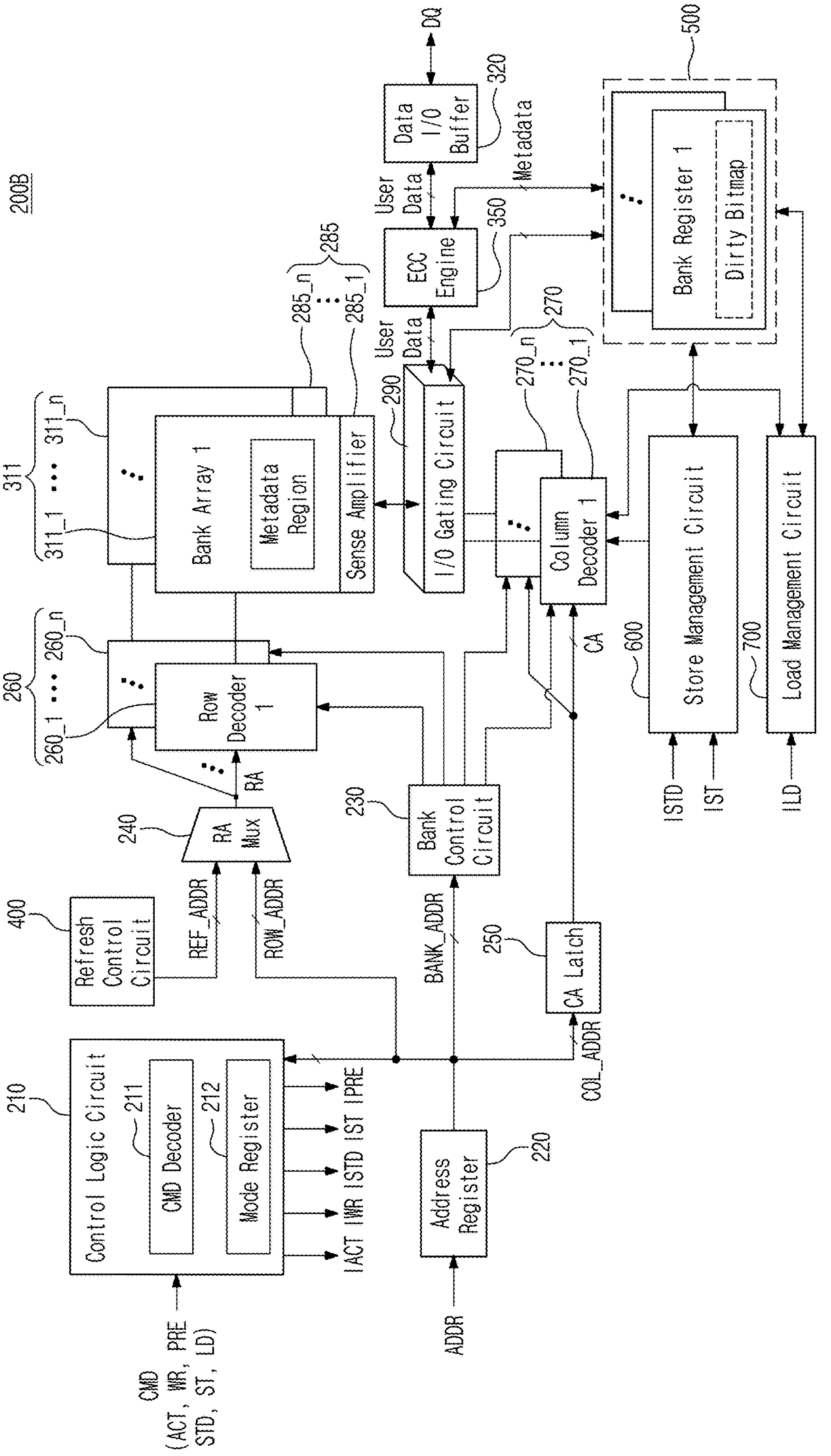
FIG. 25 is a block diagram illustrating a memory device according to one or more embodiments of the present disclosure.

FIG. 25 is a block diagram illustrating the memory device 200B according to one or more embodiments of the present disclosure. The memory device 200B of FIG. 25 may correspond to the memory device 200B of FIG. 24.

The memory device 200B of FIG. 25 is similar to the memory device 200B of FIG. 7. Accordingly, in FIG. 25, the same or similar reference numerals denote the same or similar elements, and thus, detailed descriptions of the same or similar elements will be omitted. For the convenience of explanation, similar to FIG. 7, it is assumed that the metadata region MR is allocated by a column carved-out scheme and the metadata is an ECC parity data.

Referring to FIG. 25, the memory device 200B may include a control logic circuit 210, an address register 220, a memory bank control logic 230, a refresh control circuit 400, a row address multiplexer 240, a column address latch 250, a row decoder group 260, a column decoder group 270, a memory bank array group 311, a sense amplifier group 285, an I/O gating circuit 290, an ECC engine 350, a data I/O buffer 320, a bank register group 500, the store management circuit 600, and the load management circuit 700.

The control logic circuit 210 may receive the load command LD. A command decoder 211 may decode the load command LD and may generate an internal load signal ILD.

The load management circuit 700 may control an operation of loading the metadata stored in the metadata region MR to the bank register group 500.

The load management circuit 700 may receive the internal load signal ILD. The load management circuit 700 may control the column decoder group 270 and the bank register group 500 in response to the internal load signal ILD to perform a load-clean operation. The load-clean operation may refer to an operation that loads only the clean metadata excluding the dirty metadata among the metadata stored in the metadata region MR to the bank register.

As described above, since the load-clean operation is performed using the dirty bitmap, the dirty metadata cached in the bank register may not be damaged during the load operation.

Figure 26:
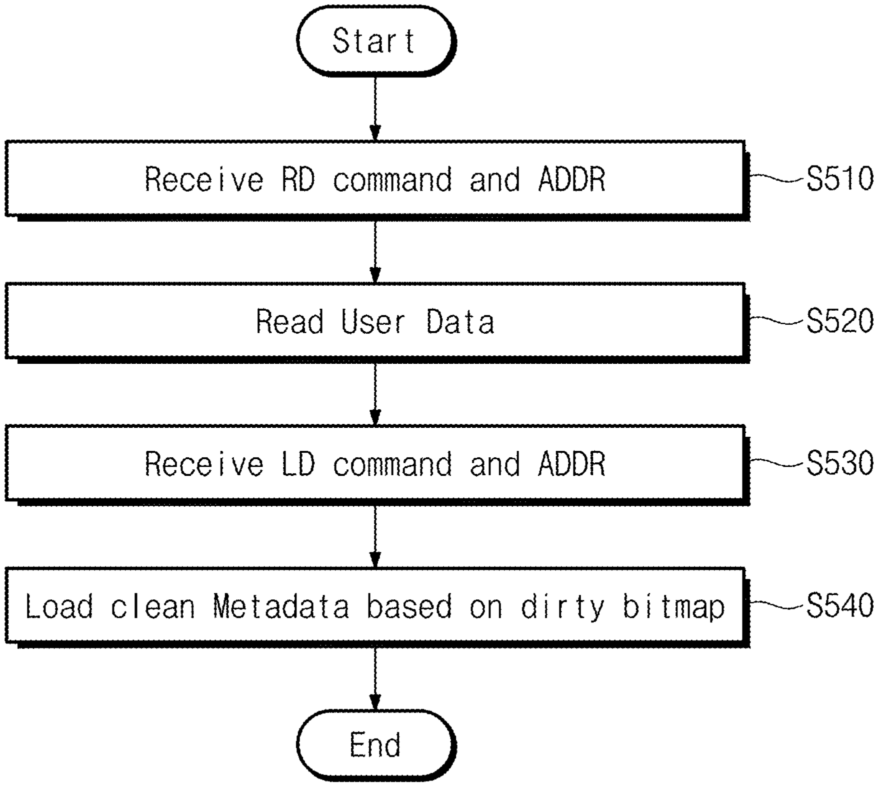
FIG. 26 is a flowchart illustrating an operation of a memory device upon receiving a load command according to one or more embodiments of the present disclosure.
Figure 27:
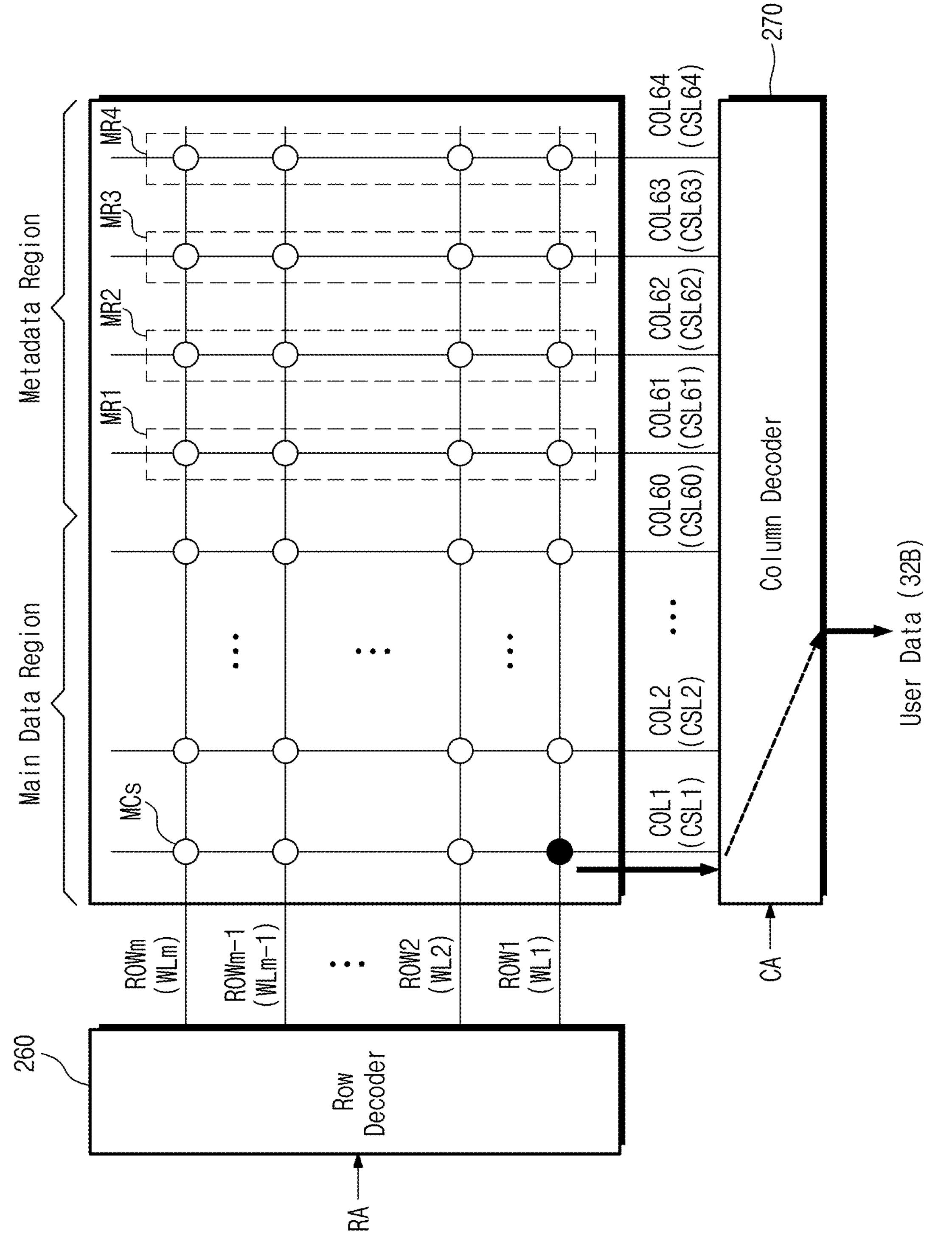
FIGS. 27 to 29 are views illustrating a load of metadata upon receiving a load command according to one or more embodiments of the present disclosure.
Figure 28:
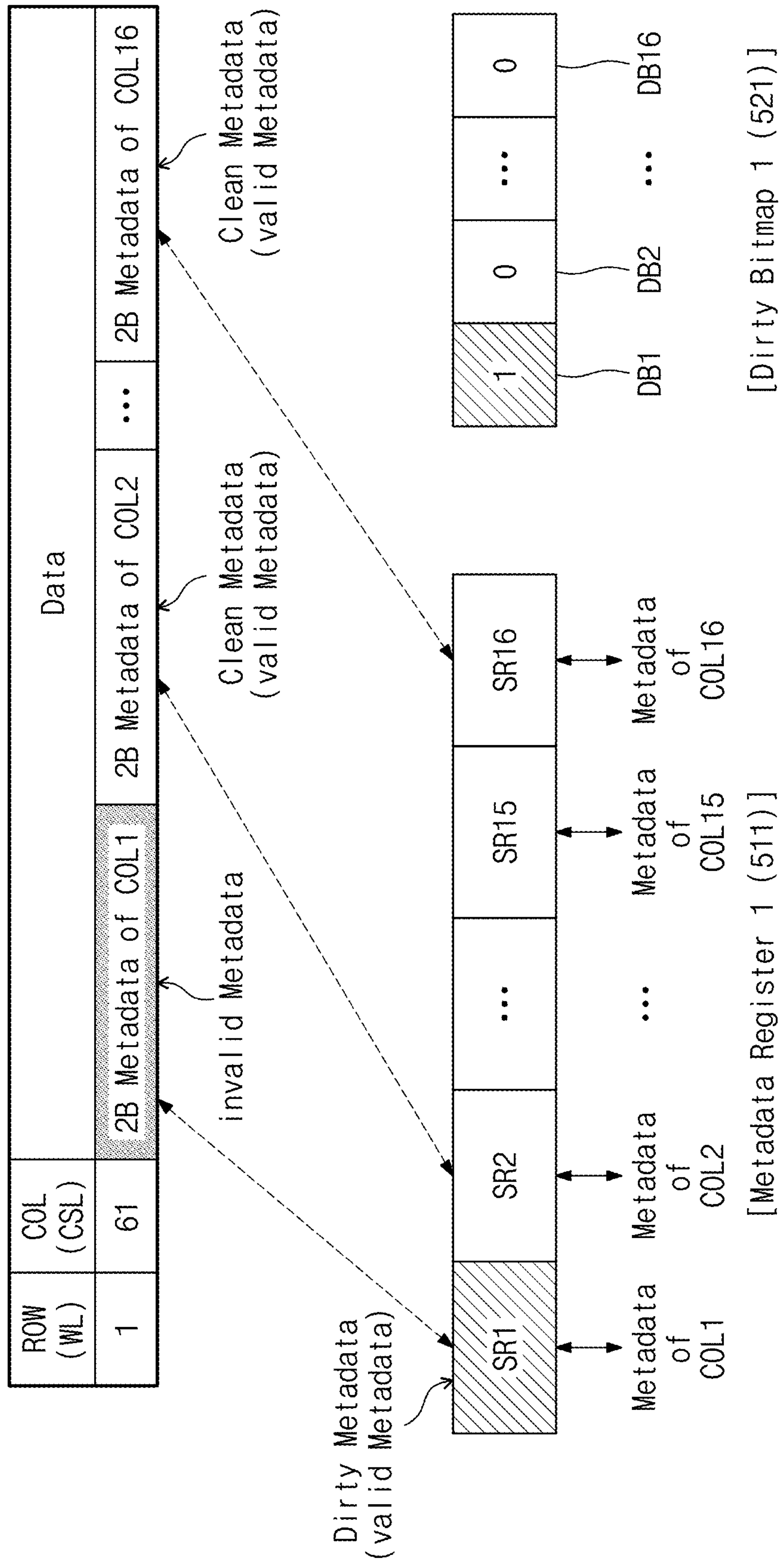
Figure 29:
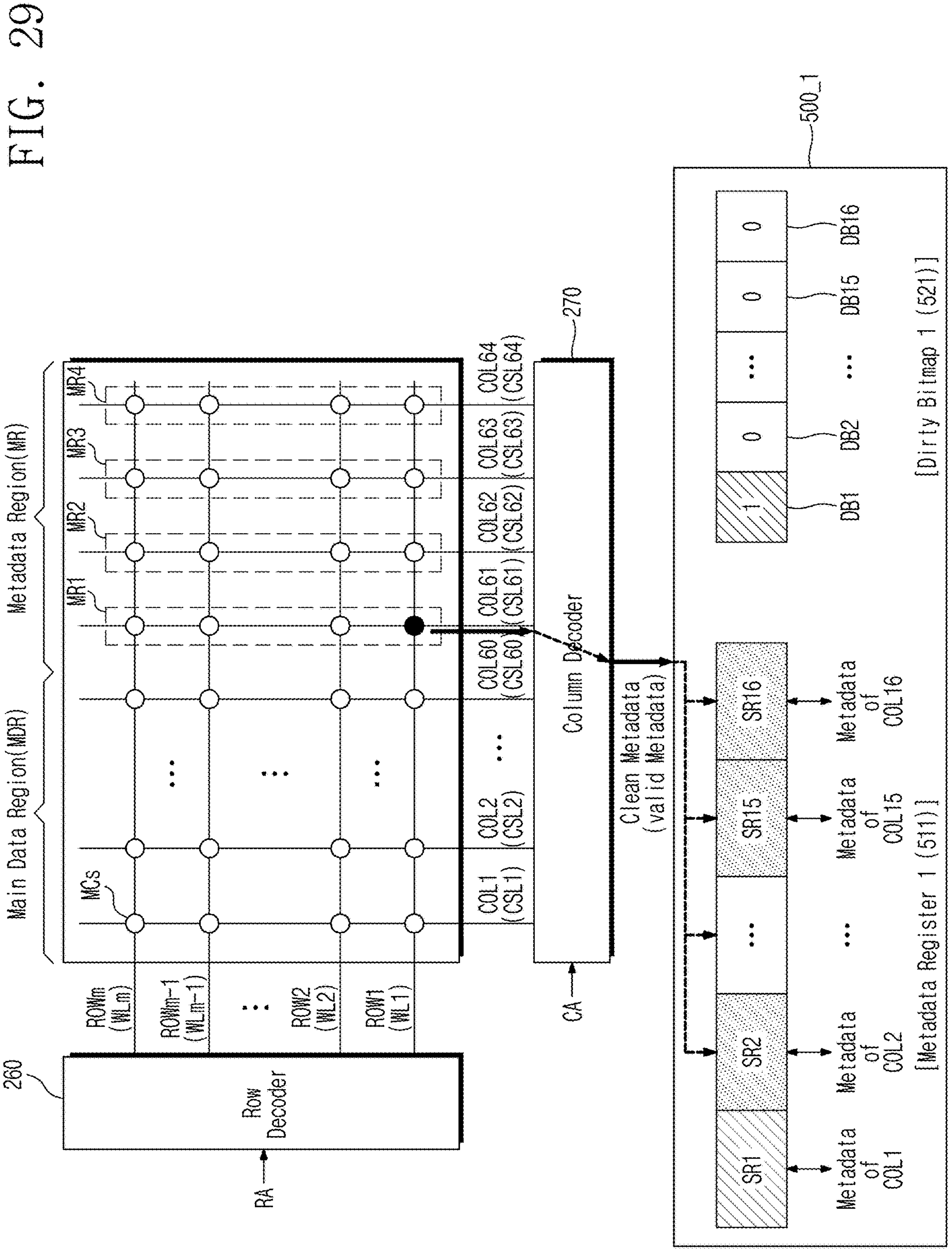

FIGS. 26 to 29 are views illustrating an operation of the memory device when receiving the load command LD. FIG. 26 is a flowchart illustrating an operation of the memory device when receiving the load command LD, and FIGS. 27 to 29 are views illustrating the load of metadata when receiving the load command LD.

For the convenience of explanation, it is assumed that the load command LD is received to load the metadata corresponding to the user data read out after a read command RD is received. In addition, it is assumed that the dirty metadata is stored in a first sub-register SR1 of a first metadata register 511. Further, it is assumed that the read command RD is a command to request a read operation with respect to the user data stored in the memory cells corresponding to a first row ROW1 and a first column COL1 and the metadata corresponding to the user data is stored in the memory cells corresponding to the first row ROW1 and a sixty-first column COL61.

Referring to FIG. 26, the memory device 200B may receive the read command RD and an address ADDR In operation S510. In this case, the received address ADDR may include a memory bank address memory bank_ADDR, a row address ROW_ADDR, and a column address COL_ADDR of the memory cells in which the user data to be read out is stored. As an example, the address ADDR may include the row address and the column address, the row address may correspond to the first row ROW1, and the column address may correspond to the first column COL1.

In operation S520, the memory device 200B may read out the user data in response to the read command RD.

As an example, the memory device 200B may read out the user data stored in the memory cells corresponding to the first row ROW1 and the first column COL1 as shown in FIG. 27.

In operation S530, the memory device 200B may receive the load command LD and the address ADDR. In this case, the received address ADDR may include a memory bank address memory bank_ADDR, a row address ROW_ADDR, and a column address COL_ADDR of the memory cells from which the metadata to be loaded is stored. As an example, the address ADDR may include the row address and the column address, the row address may correspond to the first row ROW1, and the column address may correspond to the sixty-first column COL61.

In operation S540, the memory device 200B may load only the clean metadata excluding the dirty metadata based on the dirty bitmap.

As an example, as shown in FIG. 28, the memory device 200B may determine that the dirty metadata is stored in the first sub-register SR1 of the first metadata register 511 based on a first dirty bitmap 521. That is, the memory device 200B may determine that the dirty metadata stored in the first sub-register SR1 is valid metadata with respect to the user data of the first row ROW1 and the first column COL1.

In addition, the memory device 200B may determine that the metadata corresponding to the first column COL1 is an invalid metadata and the metadata corresponding to second to sixteenth columns COL2 to COL16 are the clean metadata that are valid metadata among the metadata stored in the first row ROW1 and the sixty-first column COL61 of the metadata region MR base on the first dirty bitmap 521.

Then, as shown in FIG. 29, the memory device 200B may load only the clean metadata to the first metadata register 511. As an example, the clean metadata corresponding to the second to sixteenth columns COL2 to COL16 may be loaded to second to sixteenth sub-registers SR2 to SR16 of the first metadata register 511. As described above, since only the clean metadata is loaded and the data is not loaded to the first sub-register SR1 in which the dirty metadata is stored, the dirty metadata cached in the first sub-register SR1 may be stably maintained without being damaged or overwritten.

Meanwhile, since the dirty metadata is not yet stored in the metadata region MR, the first dirty bit DB1 of the first dirty bitmap 521 may continue to have a value of '1'.

As described with reference to FIGS. 24 to 29, the memory device 200B according to the present disclosure may support the load operation in the metadata mode. In particular, the memory device 200B may support the load-clean operation that loads only the clean data to the bank register based on the dirty bitmap. Accordingly, the memory device 200B may stably perform the load operation without damaging the dirty metadata cached in the sub-register.

Meanwhile, the embodiments described with reference to FIGS. 5 to 29 are based on the assumption that the metadata region MR is allocated by the column carved-out scheme, however, this is merely an example, and the present disclosure should not be limited thereto or thereby. As an example, the metadata region MR may be allocated by a row carved-out scheme.

Figure 30:
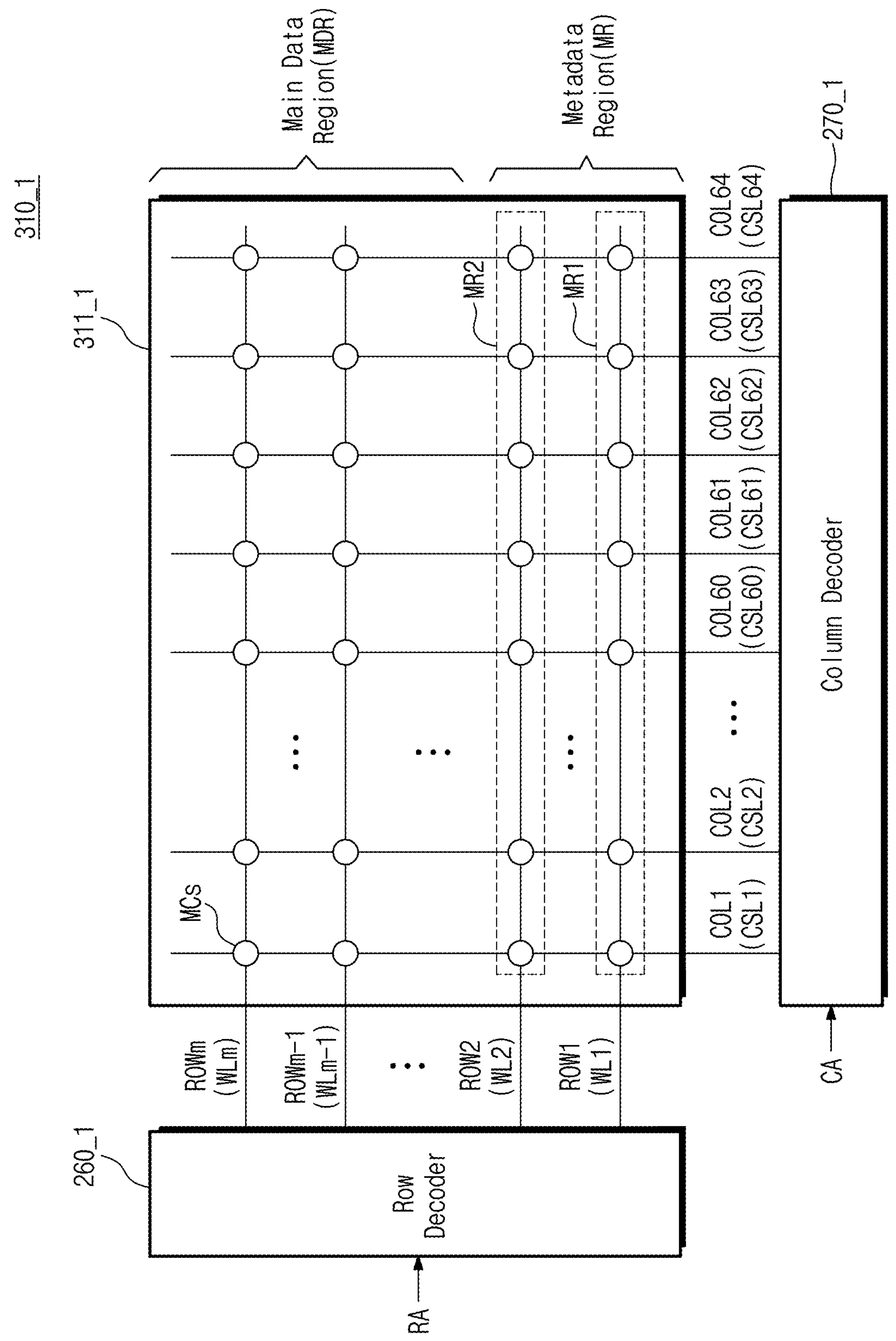
FIG. 30 is a conceptual view illustrating a memory bank including a metadata region allocated by a row carved-out scheme according to one or more embodiments of the present disclosure.

FIG. 30 is a conceptual view illustrating a first memory bank 310_1 including a metadata region MR allocated by the row carved-out scheme.

The first memory bank 310_1 of FIG. 30 is similar to the first memory bank 310_1 of FIG. 5. Accordingly, in FIG. 30, the same or similar reference numerals denote the same or similar elements in FIG. 5, and thus, detailed descriptions of the same or similar elements will be omitted.

Referring to FIG. 30, the first memory bank 310_1 may include a first memory bank array 311_1, a row decoder 260_1, and a column decoder 270_1.

The metadata region MR may be allocated by the row carved-out scheme. As an example, memory cells corresponding to a first row ROW1 may be allocated to a first metadata region MR1, and memory cells corresponding to a second row ROW2 may be allocated to a second metadata region MR2.

In this case, a store management circuit according to the present disclosure may control the row decoder 260_1 to perform a store-dirty operation or a store operation. A load management circuit according to the present disclosure may control the row decoder 260_1 to perform a load-clean operation.

As described above, even though the metadata region MR is allocated by the row carved-out scheme, an operation of storing dirty metadata cached in a bank register in the metadata region of the memory bank or an operation of loading the metadata stored in the metadata region of the memory bank to the bank register may be effectively performed.

[A Memory Controller that Effectively Schedules a Command]

Figure 31:
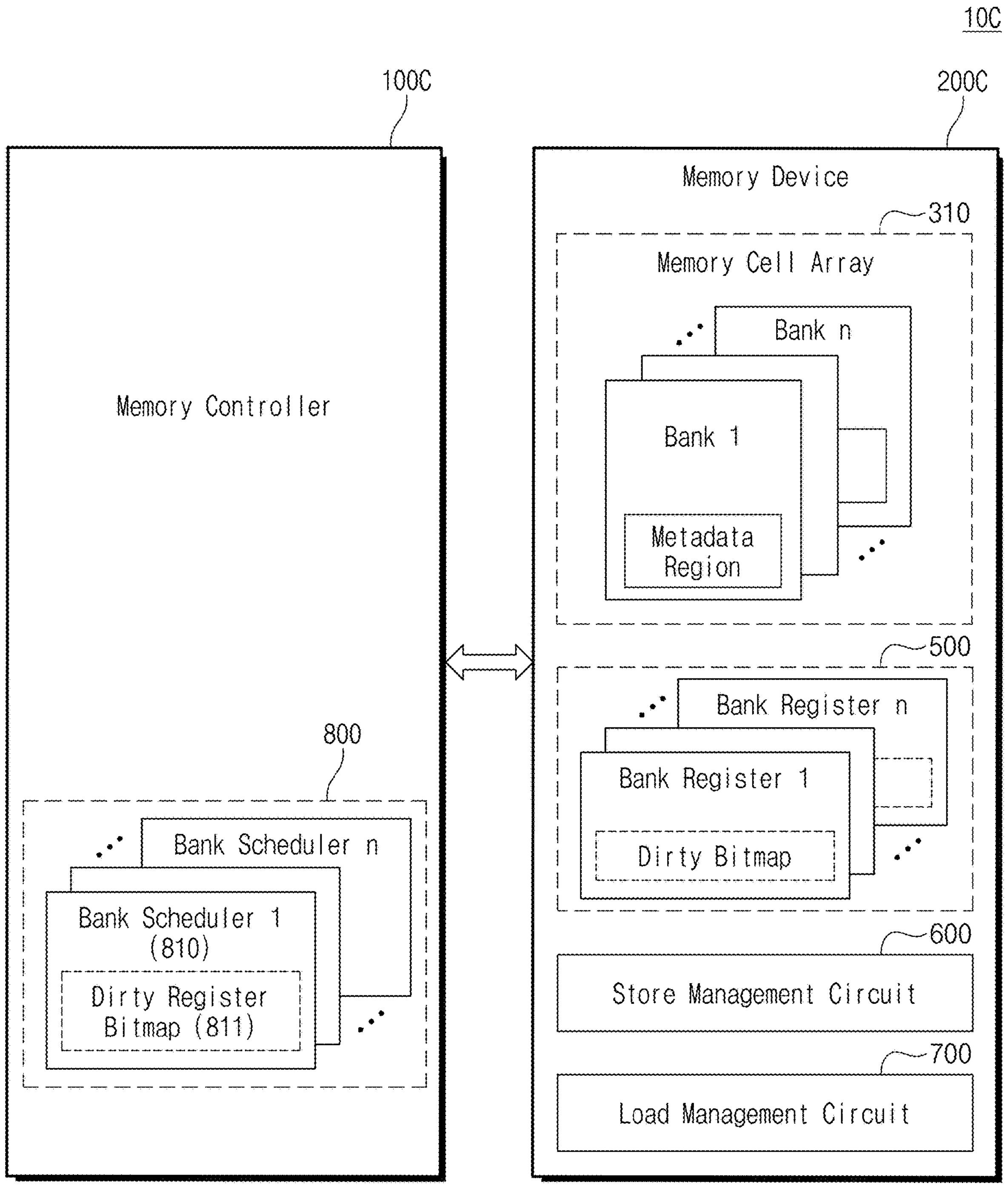
FIG. 31 is a block diagram illustrating a memory system according to one or more embodiments of the present disclosure.

FIG. 31 is a block diagram illustrating a memory system 10C according to one or more embodiments of the present disclosure. The memory system 10C of FIG. 31 is similar to the memory systems 10, 10A, and 10B of FIGS. 1, 3, and 24. Accordingly, in FIG. 31, the same or similar reference numerals denote the same or similar elements in FIGS. 1, 3, and 24, and thus, detailed descriptions of the same or similar elements will be omitted.

Referring to FIG. 31, the memory system 10C may include a memory controller 100C and a memory device 200C. The memory device 200C may include a memory cell array 310, a bank register group 500, a store management circuit 600, and a load management circuit 700.

The memory controller 100C may include a memory bank scheduler group 800. The memory bank scheduler group may include a plurality of memory bank schedulers.

The memory bank schedulers may correspond to a plurality of memory banks of the memory device 200C, respectively, and each memory bank scheduler may schedule a command transmitted to a corresponding memory bank. As an example, a first memory bank scheduler 810 may correspond to a first memory bank 310_1 and may schedule an active command ACT, a write command WR, a store command ST, a store-dirty command STD, and a precharge command PRE that are to be transmitted to the first memory bank 310_1.

Each of the memory bank schedulers may include a dirty register bitmap. The dirty register bitmap may include dirty metadata information with respect to a corresponding bank register group. As an example, a dirty register bitmap 811 of the first memory bank scheduler 810 may manage information with respect to a metadata register including dirty metadata among metadata registers of a first bank register 500_1 using a bitmap.

According to one or more embodiments of the present disclosure, each of the memory bank schedulers may schedule commands based on a corresponding dirty register bitmap. As an example, each of the memory bank schedulers may transmit one of the store command ST and the store-dirty command STD or may not transmit the store command ST and the store-dirty command STD based on the corresponding dirty register bitmap.

As described above, as the commands are scheduled based on the dirty register bitmap, a performance of a metadata mode provided by the memory system 10C may be improved.

Figure 32:
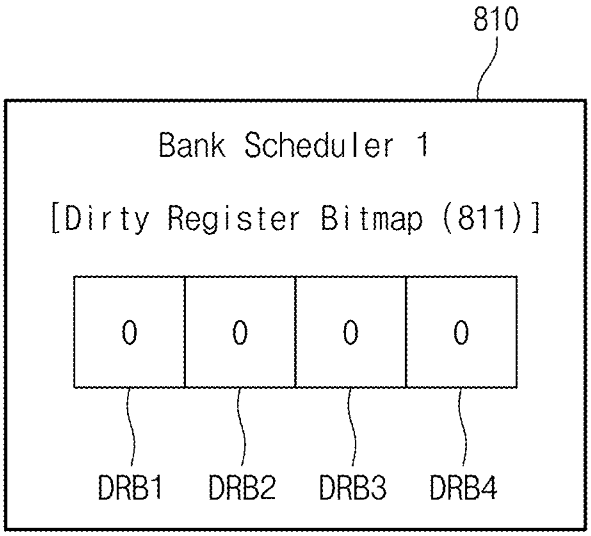
FIGS. 32 and 33 are views illustrating in detail a dirty bitmap register according to one or more embodiments of the present disclosure.
Figure 33:
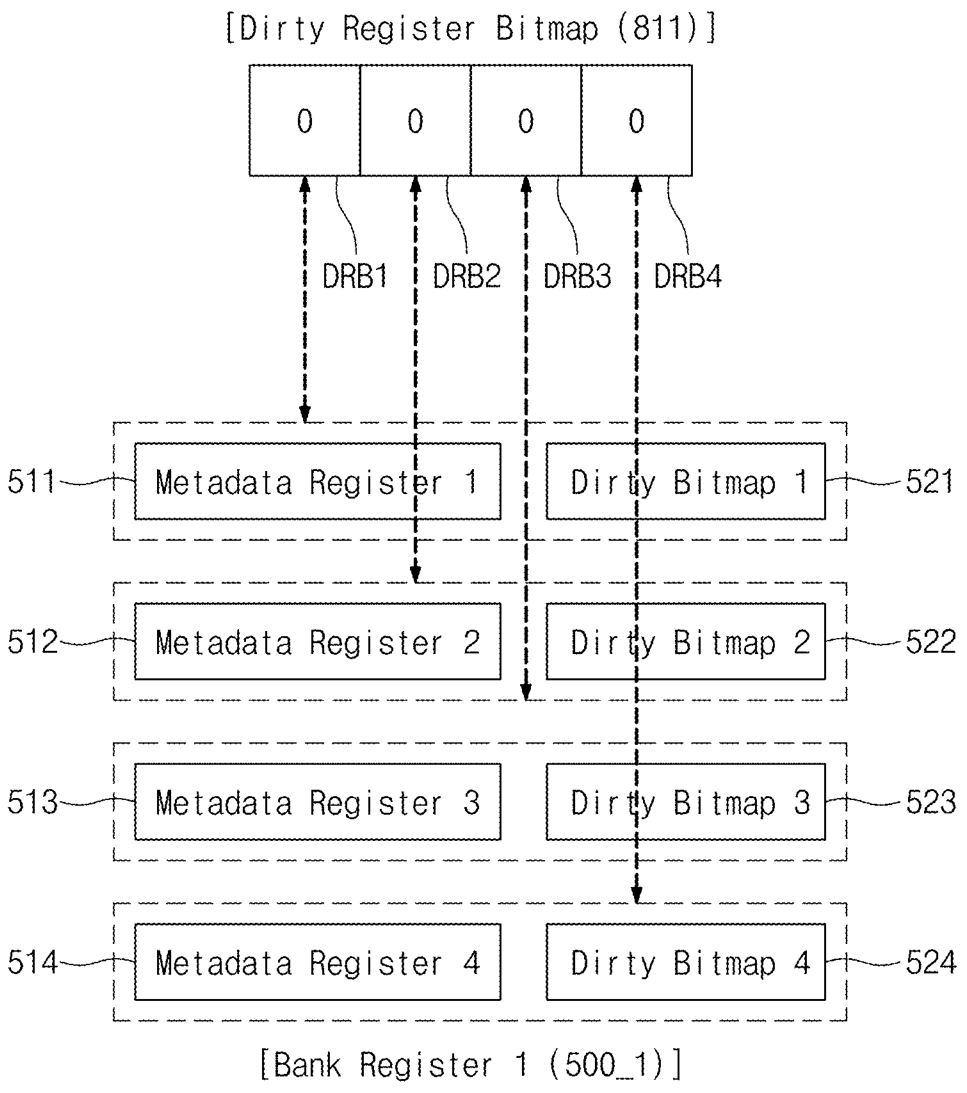

FIGS. 32 and 33 are views illustrating in detail the dirty bitmap register according to one or more embodiments of the present disclosure. In detail, FIG. 32 shows the dirty register bitmap 811 included in the first memory bank scheduler 810 as a representative example. FIG. 33 shows the dirty register bitmap 811 that displays a state of metadata registers included in the first bank register 500_1 as a representative example. For the convenience of explanation, similar to FIG. 10, it is assumed that the first bank register 500_1 includes four metadata registers.

Referring to FIGS. 32 and 33, the first memory bank scheduler 810 may include the dirty register bitmap 811, and the dirty register bitmap 811 may include first, second, third, and fourth dirty register bits DRB1 to DRB4.

The first to fourth dirty register bits DRB1 to DRB4 may correspond to first, second, third, and fourth metadata registers 511 to 514, respectively. Each of the first to fourth dirty register bits DRB1 to DRB4 may display whether the dirty metadata is stored in a corresponding metadata register.

As an example, the first dirty register bit DRB1 of the dirty register bitmap 811 may correspond to the first metadata register 511. In a case where at least one dirty metadata is stored in the first metadata register 511, a bit value of the first dirty register bit DRB1 may be set as '1'. In a case where at least one dirty metadata is not stored in the first metadata register 511, the bit value of the first dirty register bit DRB1 may be set as '0'.

Similarly, the second to fourth dirty register bits DRB2 to DRB4 of the dirty register bitmap 811 may correspond to the second to fourth metadata registers 512 to 514, respectively, and may include information about whether the dirty metadata is stored in the second to fourth metadata registers 512 to 514.

As described above, the memory controller 100C may determine whether the dirty metadata is stored in the bank register based on the dirty register bitmap and may effectively schedule the commands.

Figure 34:
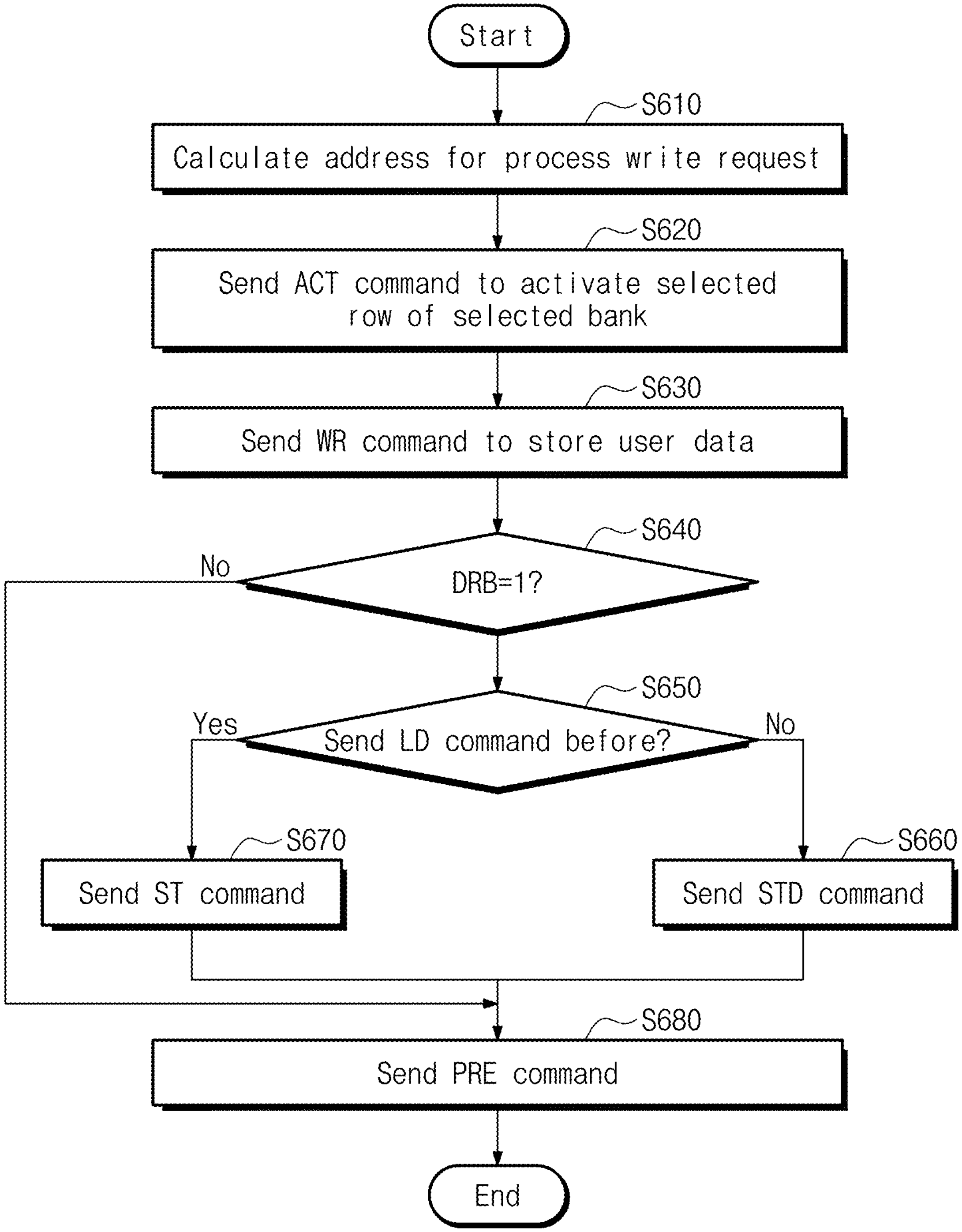
FIG. 34 is a flowchart illustrating a method of scheduling commands according to one or more embodiments of the present disclosure.
Figure 35A:
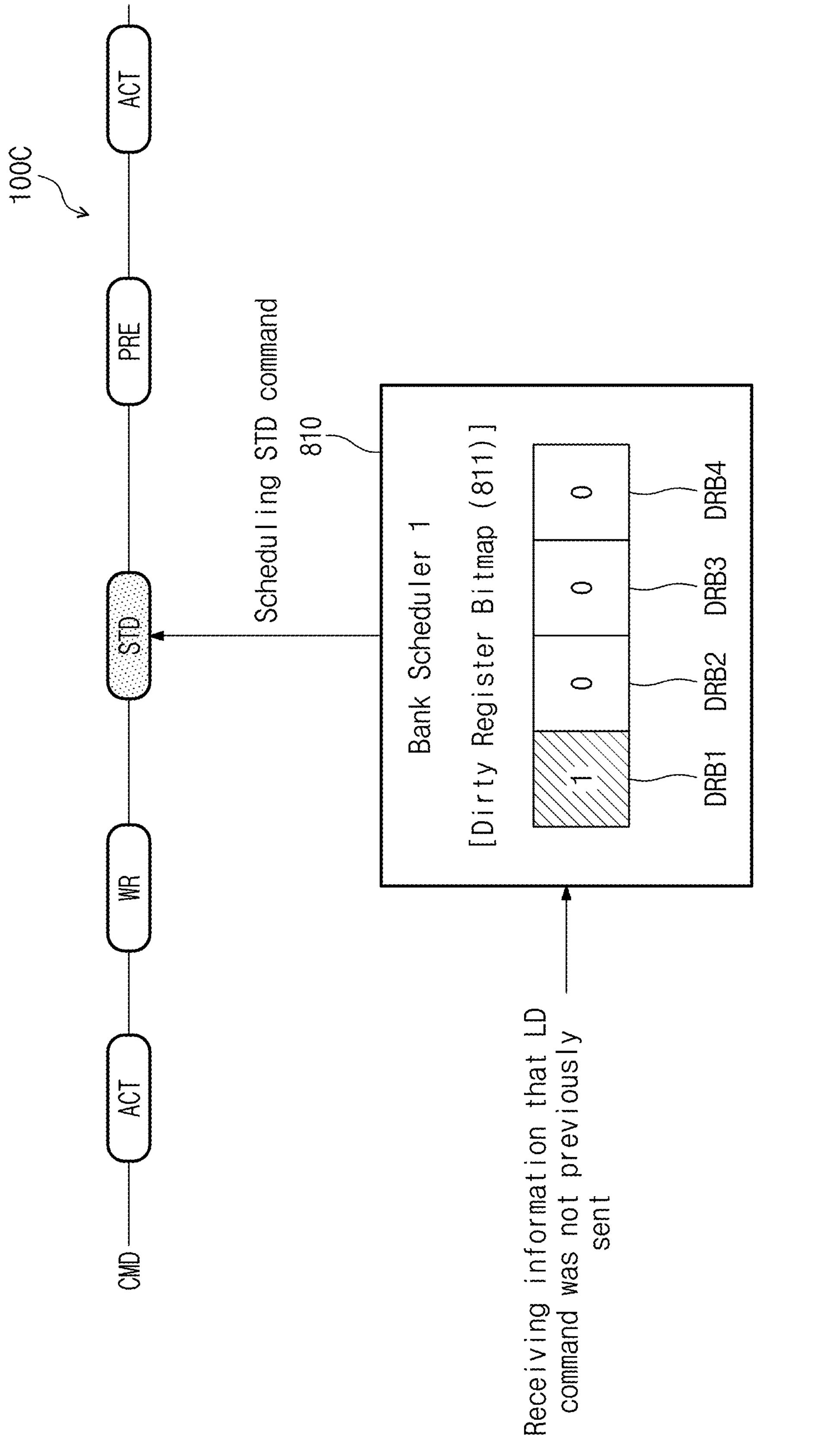
FIGS. 35A to 35C are views illustrating a method of scheduling commands according to one or more embodiments of the present disclosure.
Figure 35B:
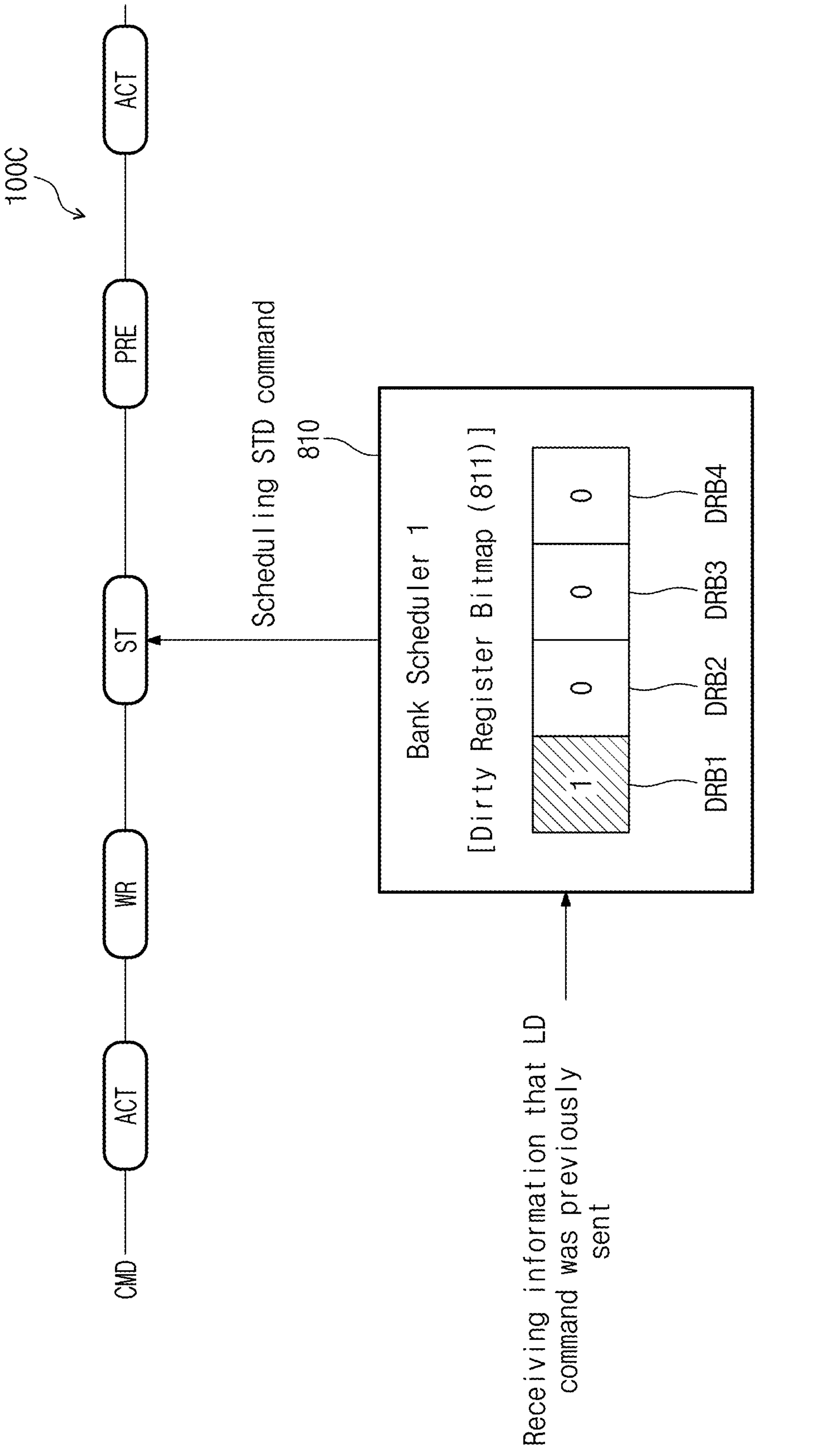
Figure 35C:
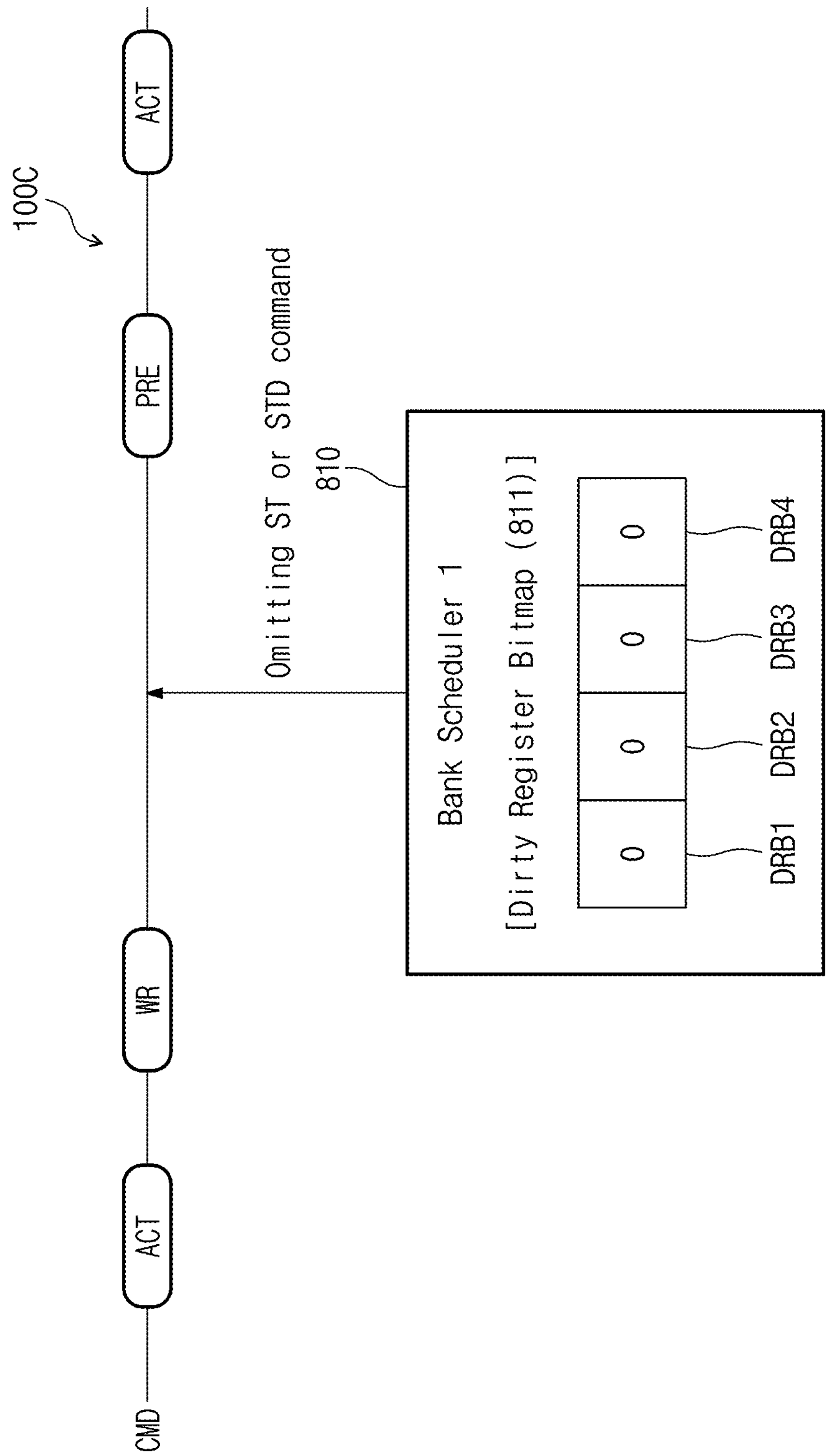

FIG. 34 is a flowchart illustrating a method of scheduling the commands according to one or more embodiments of the present disclosure. FIGS. 35A to 35C are views illustrating the method of scheduling the commands according to embodiments of the present disclosure. For the convenience of explanation, FIGS. 34 and 35A to 35C show the method of scheduling the commands for a write operation in the metadata mode.

In operation S610, the memory controller 100C (refer to FIG. 31) may calculate an address to process a write request from an outside.

In operation S620, the memory controller 100C may transmit the active command ACT to activate a selected row of a selected memory bank to the memory device 200C (refer to FIG. 31).

In operation S630, the memory controller 100C may transmit the write command WR to store user data to the memory device 200C.

In operation S640, the memory controller 100C may determine whether the bit value of the dirty register bit DRB with respect to the metadata register in which the metadata corresponding to the user data is cached is '1' based on the dirty register bitmap.

When the dirty register bit DRB is '1', an operation S650 may be performed.

In operation S650, the memory controller 100C may determine whether the load operation has previously been performed on the metadata register in which the metadata corresponding to the user data is cached. That is, it is determined whether a load command LD is transmitted.

When it is determined that the load command LD has not been previously transmitted, an operation S660 may be performed. The memory controller 100C may transmit the store-dirty command STD in the operation S660.

As shown in FIG. 35A, when the bit value of the dirty register bit DRB1 corresponding to the first metadata register 511 (refer to FIG. 33) is '1', the memory controller 100C may determine that the dirty metadata is included in the first metadata register 511. In addition, in a case where the load command LD has not been previously transmitted, an invalid metadata may be included in the first metadata register 511.

In this case, the memory controller 100C may transmit the store-dirty command STD to the memory device 200C to allow only the dirty metadata to be stored in a metadata region MR. Accordingly, a valid metadata stored in the metadata region MR may be prevented from being damaged by the invalid metadata of the first metadata register 511.

In a case where the load command LD has previously been transmitted, an operation S670 may be performed. The memory controller 100C may transmit the store command ST in the operation S670.

As shown in FIG. 35B, in a case where the bit value of the dirty register bit DRB1 corresponding to the first metadata register 511 is '1', the memory controller 100C may determine that the dirty metadata is included in the first metadata register 511. In addition, in the case where the load command LD has previously been transmitted, it is determined that the metadata of the first metadata register 511 excluding the dirty metadata is substantially the same valid metadata as that stored in the metadata region MR.

In this case, the memory controller 100C may transmit the store command ST to the memory device 200C. Accordingly, the valid metadata including the dirty metadata cached in the first metadata register 511 may be stored in the metadata region MR. In this case, the metadata may be stored in the metadata region MR more quickly compared to performing the store-dirty operation.

Meanwhile, when the bit value of the dirty register bit DRB is '0', the operation of transmitting the store-dirty command STD or the store command ST may be omitted. As an example, as shown in FIG. 35C, when the bit value of the first dirty register bit DRB1 is '0', the memory controller 100C may not transmit the store-dirty command STD or the store command ST.

Then, the memory controller 100C may transmit the precharge command PRE to the memory device 200C In operation S680. Accordingly, the write operation in the metadata mode may be finished.

As described with reference to FIGS. 31 and 35A to 35C, the memory controller 100C according to the present disclosure may effectively schedule the commands based on the dirty register bitmap, and thus, the performance of the metadata mode may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
- a memory bank comprising a plurality of memory cells; and
- a bank register corresponding to the memory bank,
- wherein the memory bank comprises:
  - a main data region configured to store user data; and
  - a metadata region configured to store metadata corresponding to the user data, and
- wherein the bank register comprises:
  - a metadata register configured to cache the metadata to be stored in the metadata region; and
  - a dirty bitmap comprising location information indicating where the metadata is to be stored in the metadata region,
  - wherein the metadata register comprises a plurality of sub-registers configured to store a plurality of metadata corresponding to a plurality of user data, and the dirty bitmap comprises a plurality of dirty bits corresponding to the plurality of sub-registers.

2. The memory device of claim 1, wherein a plurality of different columns of the memory bank is allocated for the user data, and
- wherein a same column, among the plurality of different columns, is allocated for the metadata corresponding to the user data.

3. The memory device of claim 1, further comprising a store management circuit configured to:
- cache dirty metadata in a sub-register selected from the plurality of sub-registers in response to a write command; and
- change a bit value of a first dirty bit among the plurality of dirty bits, the first dirty bit corresponding to the selected sub-register in which the dirty metadata is stored.

4. The memory device of claim 3, wherein the store management circuit is further configured to store the dirty metadata cached in the selected sub-register in response to a store-dirty command.

5. The memory device of claim 4, wherein the store management circuit is configured to restrict metadata cached in a sub-register, which is not selected among the plurality of sub-registers, from being stored in the metadata region in response to the store-dirty command.

6. The memory device of claim 4, wherein the store management circuit is further configured to initialize the bit value of the first dirty bit corresponding to the selected sub-register after the metadata cached in the selected sub-register is stored in the metadata region.

7. The memory device of claim 3, wherein the store management circuit is further configured to store the dirty metadata cached in the selected sub-register and metadata cached in non-selected sub-registers that are not selected from the plurality of sub-registers, in the metadata region in response to a store command.

8. The memory device of claim 7, wherein the store management circuit is further configured to initialize the bit value of the first dirty bit corresponding to the selected sub-register after the dirty metadata cached in the selected sub-register and the metadata cached in the non-selected sub-registers are stored in the metadata region.

9. The memory device of claim 3, further comprising a load management circuit configured to:
- load the metadata stored in the metadata region to the plurality of sub-registers in response to a load command; and
- load clean metadata stored in the metadata region to non-selected sub-registers that are not selected from the plurality of sub-registers.

10. The memory device of claim 9, wherein the load management circuit is configured to restrict the metadata stored in the metadata region from being loaded to the selected sub-register in which the dirty metadata is cached.

11. The memory device of claim 10, wherein the load management circuit is configured to maintain the bit value of the first dirty bit corresponding to the selected sub-register after the clean metadata stored in the metadata region is loaded to the non-selected sub-registers.

12. A memory system comprising:
- a memory device configured to store user data and metadata corresponding to the user data; and
- a memory controller configured to control the memory device,
- wherein the memory device comprises:
  - a memory bank comprising a plurality of memory cells; and
  - a bank register corresponding to the memory bank,
- wherein the memory bank comprises:
  - a main data region configured to store the user data; and
  - a metadata region configured to store the metadata corresponding to the user data,
- wherein the bank register comprises:
  - a metadata register configured to cache the metadata to be stored in the metadata region; and
  - a dirty bitmap comprising location information indicating where the metadata is to be stored in the metadata region, and
- wherein the memory controller comprises:
  - a dirty register bitmap comprising information about whether dirty metadata is stored in the metadata register; and
  - a scheduler configured to schedule commands to be provided to the memory device based on the dirty register bitmap.

13. The memory system of claim 12, wherein the scheduler is further configured to transmit a store-dirty command to the memory device when the dirty metadata is cached in the metadata register and a load command has not been previously transmitted to the memory device.

14. The memory system of claim 13, wherein the metadata register comprises a plurality of sub-registers configured to store a plurality of metadata corresponding to the user data, and
- the memory device is further configured to store the dirty metadata cached in a sub-register, which is selected from the plurality of sub-registers, in the metadata region in response to the store-dirty command, and restrict metadata cached in a sub-register, which is not selected from the plurality of sub-registers, from being stored in the metadata region.

15. The memory system of claim 12, wherein the scheduler is configured to transmit a store command to the memory device when the dirty metadata is cached in the metadata register and a load command has been previously transmitted to the memory device.

16. The memory system of claim 15, wherein the metadata register comprises a plurality of sub-registers configured to store the metadata corresponding to the user data, and the memory device is further configured to store the dirty metadata cached in a sub-register that is selected from the plurality of sub-registers and the metadata cached in a sub-register, which is not selected among the plurality of sub-registers, in the metadata region in response to the store command.

17. The memory system of claim 12, wherein the scheduler is configured to omit a transmission of a store-dirty command and a store command when the dirty metadata is not cached in the metadata register.

18. A method of operating a memory system comprising a memory device and a memory controller configured to track whether metadata registers in the memory device contain dirty metadata based on a dirty bitmap stored in the memory device, the method comprising:

enabling the memory controller to transmit an active command to the memory device to activate a selected row of a selected memory bank comprising a metadata region;

enabling the memory controller to transmit a write command to store user data in the selected memory bank;

enabling the memory controller to selectively transmit a store-dirty command or a store command to the memory device based on the dirty bitmap, the store-dirty command being transmitted based on the dirty metadata being stored in a metadata register in which metadata with respect to the user data is stored, and the store command being transmitted based on the memory controller having previously transmitted a load command to the memory device; and enabling the memory controller to transmit a precharge command to the memory device, wherein the metadata register comprises a plurality of sub-registers configured to store a plurality of metadata corresponding to a plurality of user data, and the dirty bitmap comprises a plurality of dirty bits corresponding to the plurality of sub-registers.

* * * * *